(12) United States Patent
Suda et al.

(10) Patent No.: US 10,597,078 B2
(45) Date of Patent: Mar. 24, 2020

(54) VEHICLE

(71) Applicants: THE UNIVERSITY OF TOKYO, Tokyo (JP); EQUOS RESEARCH CO., LTD., Tokyo (JP)

(72) Inventors: Yoshihiro Suda, Tokyo (JP); Jeffrey Too Chuan Tan, Tokyo (JP); Hiroki Arakawa, Tokyo (JP); Keizo Araki, Tokyo (JP); Akira Mizuno, Tokyo (JP)

(73) Assignees: THE UNIVERSITY OF TOKYO, Tokyo (JP); EQUOS RESEARCH CO., LTD., Tokyo (JP)

( * ) Notice: Subject to any disclaimer, the term of this patent is extended or adjusted under 35 U.S.C. 154(b) by 156 days.

(21) Appl. No.: 15/762,845

(22) PCT Filed: Aug. 28, 2017

(86) PCT No.: PCT/JP2017/030755
§ 371 (c)(1),
(2) Date: Mar. 23, 2018

(87) PCT Pub. No.: WO2018/043408
PCT Pub. Date: Mar. 8, 2018

(65) Prior Publication Data
US 2018/0290684 A1 Oct. 11, 2018

(30) Foreign Application Priority Data
Aug. 29, 2016 (JP) .................. 2016-166678

(51) Int. Cl.
*B62D 9/04* (2006.01)
*B62K 5/10* (2013.01)
(Continued)

(52) U.S. Cl.
CPC .......... *B62D 9/04* (2013.01); *B60G 17/0162* (2013.01); *B60G 17/0195* (2013.01);
(Continued)

(58) Field of Classification Search
None
See application file for complete search history.

(56) References Cited

U.S. PATENT DOCUMENTS

| 8,123,240 B2* | 2/2012 | Mercier | B62D 9/02 |
|---|---|---|---|
| | | | 280/124.103 |
| 8,251,375 B2* | 8/2012 | Hara | B62D 9/02 |
| | | | 280/5.506 |
| 8,997,911 B2* | 4/2015 | Hayashi | B60G 17/015 |
| | | | 180/210 |
| 9,037,347 B2* | 5/2015 | Hayashi | B60G 17/015 |
| | | | 313/146 |

(Continued)

FOREIGN PATENT DOCUMENTS

| JP | 2009-67216 A | 4/2009 |
|---|---|---|
| JP | 2011042181 A * | 3/2011 |

(Continued)

OTHER PUBLICATIONS

Nov. 7, 2017 International Search Report issued in International Patent Application No. PCT/JP2017/030755.
(Continued)

*Primary Examiner* — Drew J Brown
(74) *Attorney, Agent, or Firm* — Oliff PLC

(57) ABSTRACT

A vehicle is configured to travel, when a vehicle velocity is within a velocity range from not less than a first velocity of at least zero to not more than a second velocity larger than the first velocity, in a mode in which a vehicle body is leaned by a lean mechanism according to an input into an operation input unit, and a wheel angle of a turn wheel changes following a lean of the vehicle body. A natural frequency of roll oscillation of the vehicle body is either within a range of smaller than a reference frequency or within a range of larger than the reference frequency, the reference frequency being a frequency at which oscillation of the wheel angle of the turn wheel has phase delay of 90 degrees relative to the roll oscillation of the vehicle body in its width direction.

9 Claims, 18 Drawing Sheets

(51) Int. Cl.
  *B60W 30/04* (2006.01)
  *B60W 40/112* (2012.01)
  *B60W 40/105* (2012.01)
  *B60G 17/0195* (2006.01)
  *B60G 17/016* (2006.01)
  *B62K 5/027* (2013.01)
  *B60L 15/20* (2006.01)
  *B62K 5/00* (2013.01)

(52) U.S. Cl.
  CPC ......... *B60L 15/2054* (2013.01); *B60W 30/04* (2013.01); *B60W 40/105* (2013.01); *B60W 40/112* (2013.01); *B62K 5/027* (2013.01); *B62K 5/10* (2013.01); *B60G 2202/42* (2013.01); *B60G 2300/45* (2013.01); *B60G 2300/50* (2013.01); *B60G 2400/0511* (2013.01); *B60G 2400/204* (2013.01); *B60G 2400/302* (2013.01); *B60G 2400/34* (2013.01); *B60G 2400/39* (2013.01); *B60G 2400/41* (2013.01); *B60G 2400/412* (2013.01); *B60G 2600/02* (2013.01); *B60G 2800/012* (2013.01); *B60G 2800/0124* (2013.01); *B60L 2200/24* (2013.01); *B60L 2240/12* (2013.01); *B60L 2240/20* (2013.01); *B60L 2240/24* (2013.01); *B60L 2240/421* (2013.01); *B60L 2240/461* (2013.01); *B62K 2005/001* (2013.01); *B62K 2207/02* (2013.01); *Y02T 10/7275* (2013.01)

(56) References Cited

U.S. PATENT DOCUMENTS

| | | | | |
|---|---|---|---|---|
| 10,040,478 | B2* | 8/2018 | Horiguchi | B62K 5/08 |
| 2007/0075517 | A1* | 4/2007 | Suhre | B60G 3/20 |
| | | | | 280/124.134 |
| 2008/0238005 | A1* | 10/2008 | James | B62D 9/02 |
| | | | | 280/5.509 |
| 2012/0181765 | A1* | 7/2012 | Hill | B62K 5/027 |
| | | | | 280/62 |
| 2014/0312580 | A1* | 10/2014 | Gale | B60G 21/073 |
| | | | | 280/5.509 |
| 2018/0148118 | A1* | 5/2018 | Horiguchi | B62K 5/02 |
| 2018/0265156 | A1* | 9/2018 | Hara | B62D 5/046 |
| 2018/0281886 | A1* | 10/2018 | Mizuno | B62K 5/10 |

FOREIGN PATENT DOCUMENTS

| | | |
|---|---|---|
| JP | 2012-180011 A | 9/2012 |
| JP | 2014-69675 A | 4/2014 |
| WO | 2011/083335 A2 | 7/2011 |

OTHER PUBLICATIONS

Nov. 7, 2017 Written Opinion of the International Searching Authority issued in International Patent Application No. PCT/JP2017/030755.

* cited by examiner

VEHICLE

TECHNICAL FIELD

This specification relates to a vehicle which turns by leaning its vehicle body.

BACKGROUND ART

Vehicles which lean during turning have been proposed. For example, a technique was proposed where a front wheel moves freely in a caster fashion, and a vehicle body is leaned to a direction specified by a direction to which a driver moves a control device.

PRIOR ART DOCUMENT

Patent Document

Patent Document 1 WO 2011/083335

SUMMARY OF THE INVENTION

Problems to be Solved by the Invention

However, a change in wheel orientation may increase oscillation of a vehicle body in its width direction. For example, a centrifugal force caused by a turn according to the wheel orientation may increase oscillation of the vehicle body in its width direction.

This specification discloses a technique which can suppress an increase in oscillation of a vehicle body in its width direction.

Means for Solving the Problems

For example, this specification discloses the following application examples.

Application Example 1

A vehicle comprising:
three or more wheels including a pair of wheels spaced apart from each other in a width direction of the vehicle and one or more turn wheels constituted by at least one of another wheel and the pair of wheels, the one or more turn wheels being turnable to right and left relative to a direction of forward movement of the vehicle;
a vehicle body coupled to the plurality of wheels and rollable in the width direction;
an operation input unit to be operated to input a turning direction; and
a lean mechanism for leaning the vehicle body in the width direction,
wherein the vehicle is configured to travel, when a vehicle velocity is within a velocity range from not less than a first velocity of at least zero to not more than a second velocity larger than the first velocity, in a mode in which the vehicle body is leaned by the lean mechanism according to an input into the operation input unit, and a wheel angle changes following a lean of the vehicle body, the wheel angle is an angle of traveling direction of the one or more turn wheels with reference to the direction of forward movement of the vehicle, and
when the vehicle velocity is within the velocity range, a natural frequency of the roll oscillation of the vehicle body is either within a range of smaller than a reference frequency or within a range of larger than the reference frequency, the reference frequency being a frequency at which oscillation of the wheel angle of the one or more turn wheels has phase delay of 90 degrees relative to the roll oscillation of the vehicle body in the width direction.

According to this configuration, it is possible to suppress an increase in oscillation of the vehicle body in its width direction due to a delayed phase of the wheel angle.

Application Example 2

The vehicle of Application Example 1,
wherein when the reference frequency at the first velocity is specified as a first reference frequency, and the reference frequency at the second velocity is specified as a second reference frequency,
the natural frequency of the roll oscillation of the vehicle body is either within a range of smaller than the first reference frequency or within a range of larger than the second reference frequency.

According to this configuration, it is possible to suppress an increase in oscillation of the vehicle body in its width direction due to a delayed phase of the wheel angle.

Application Example 3

The vehicle of Application Example 2, comprising:
a turn wheel support unit supporting the one or more turn wheels,
wherein the first velocity is larger than zero,
the natural frequency of the vehicle body is smaller than the first reference frequency, and
the turn wheel support unit
allows a wheel angle of the one or more turn wheels to change following a lean of the vehicle body when the vehicle velocity is within the velocity range, and
changes the wheel angle according to an input into the operation input unit when the vehicle velocity is smaller than the first velocity.

According to this configuration, it is possible to suppress an increase in oscillation of the vehicle body in its width direction when the vehicle velocity is smaller than the first velocity.

Application Example 4

The vehicle of Application Example 2,
wherein the natural frequency of the vehicle body is larger than the second reference frequency, and
the second velocity is a maximum velocity of the vehicle.

According to this configuration, it is possible to suppress an increase in oscillation of the vehicle body in its width direction when the vehicle velocity is equal to or smaller than the maximum velocity.

Application Example 5

The vehicle of Application Example 4, comprising:
a drive device for driving at least one of the plurality of wheels; and
an output limiting unit for lowering output of the drive device when the vehicle velocity exceeds a predetermined upper limit,
wherein the maximum velocity is the upper limit of the vehicle velocity.

According to this configuration, it is possible to suppress an increase in oscillation of the vehicle body in its width direction when the vehicle velocity is equal to or smaller than the upper limit.

Application Example 6

The vehicle of Application Example 2, comprising:
a turn wheel support unit supporting the one or more turn wheels,
wherein the natural frequency of the vehicle body is larger than the second reference frequency, and
the turn wheel support unit
allows a wheel angle of the one or more turn wheels to change following a lean of the vehicle body when the vehicle velocity is within the velocity range, and
changes the wheel angle according to an input into the operation input unit when the vehicle velocity exceeds the second velocity.
According to this configuration, it is possible to suppress an increase in oscillation of the vehicle body in its width direction when the vehicle velocity is larger than the second velocity.

Application Example 7

The vehicle of any one of Application Example 1 to 6, comprising:
changing unit for changing the natural frequency of the roll oscillation of the vehicle body,
wherein the changing unit changes the natural frequency according to the vehicle velocity.
According to this configuration, it is possible to properly suppress according to the vehicle velocity an increase in oscillation of the vehicle body in its width direction.

Application Example 8

The vehicle of Application Example 7,
wherein when the vehicle velocity is lower, the changing unit makes the natural frequency smaller than when the vehicle velocity is higher.
According to this configuration, it is possible to properly suppress according to the vehicle velocity an increase in oscillation of the vehicle body in its width direction.

Application Example 9

The vehicle of any one of Application Example 1 to 8, comprising:
a supporting member rotatably supporting the one or more turn wheels,
a turning device connecting the vehicle body and the supporting member, and supporting the supporting member turnably to right and left relative to the direction of forward movement of the vehicle, and
a connecting unit connected to the operation input unit and to the supporting member, the connecting unit allowing the wheel angle of the one or more turn wheels to change following a change in lean of the vehicle body independently of an input into the operation input unit.
This configuration enables a user to modify the orientation of the one or more turn wheels by handling the operation input unit, and thus improving driving stability.

It should be noted that the techniques disclosed in this specification can be realized in a variety of aspects, for example, a vehicle, a vehicle controller, a vehicle control method, etc.

DESCRIPTION OF EMBODIMENTS

A. First Embodiment

Figure 1:
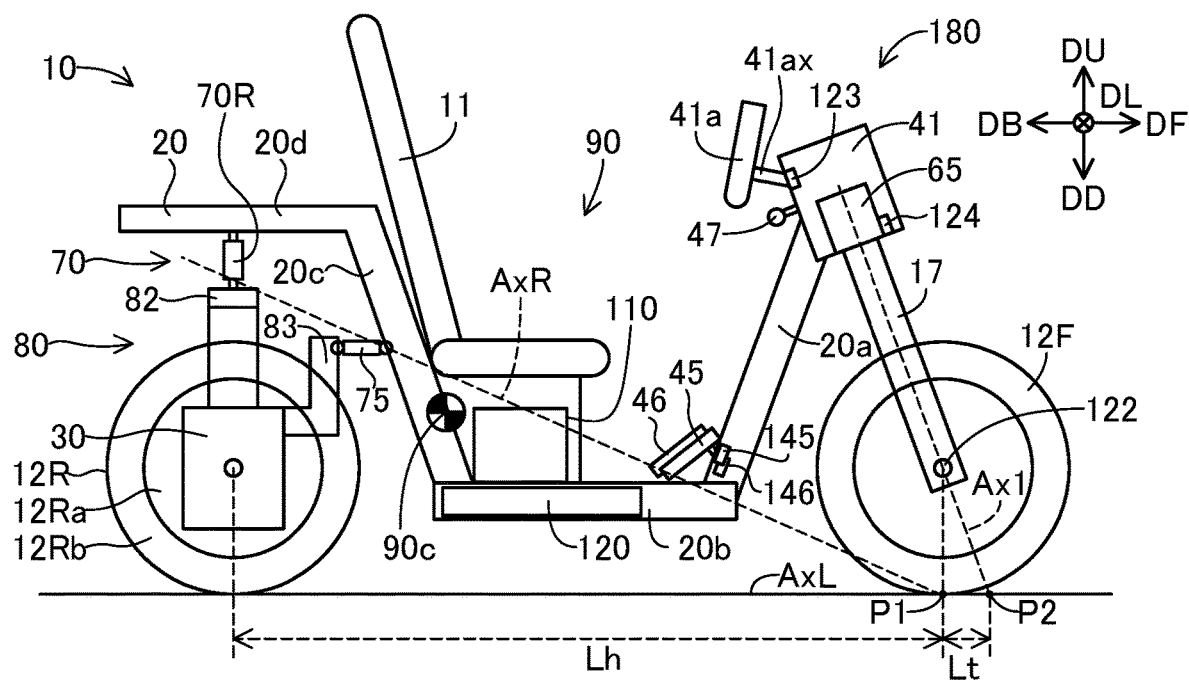
FIG. 1 is an explanatory diagram showing the vehicle 10.
Figure 2:
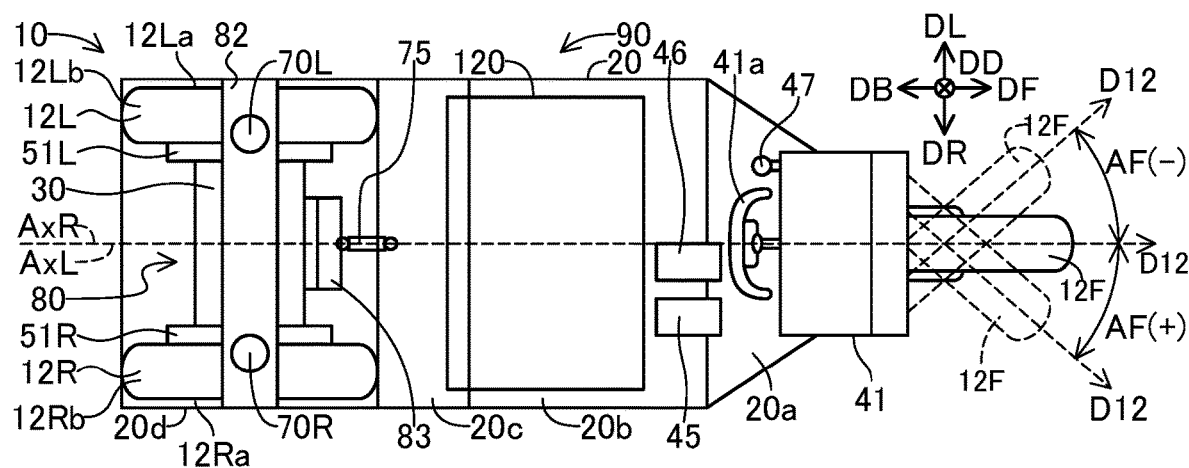
FIG. 2 is an explanatory diagram showing the vehicle 10.
Figure 3:
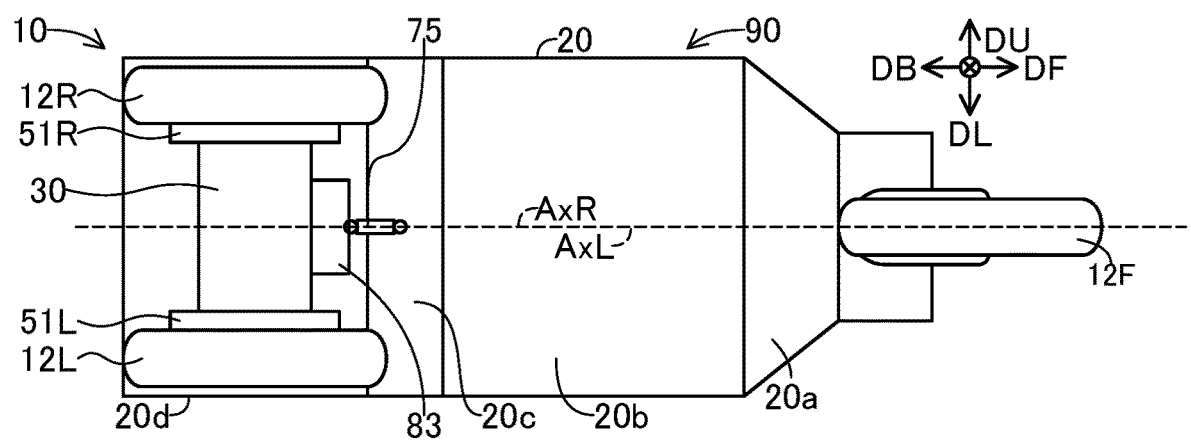
FIG. 3 is an explanatory diagram showing the vehicle 10.
Figure 4:
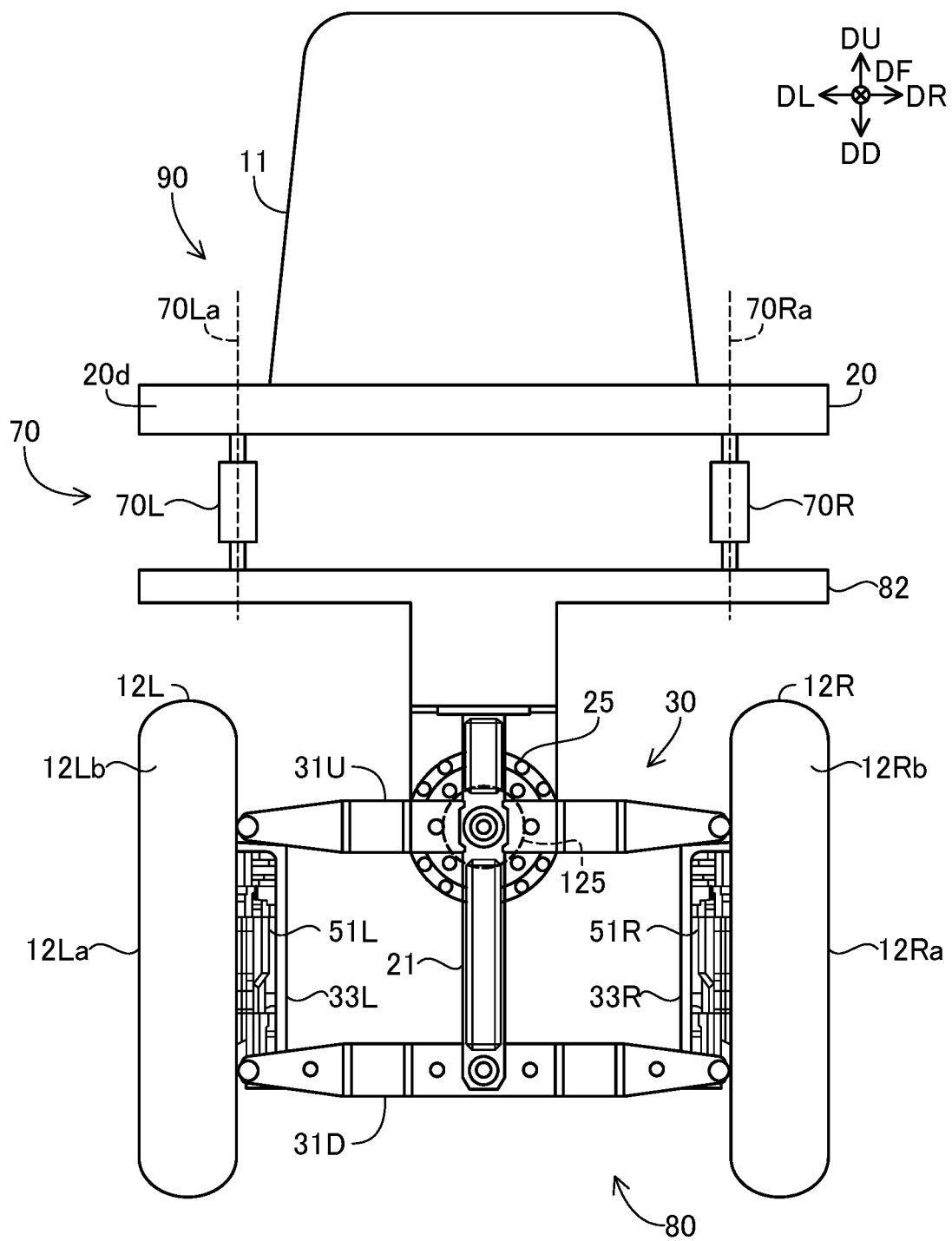
FIG. 4 is an explanatory diagram showing the vehicle 10.

FIGS. 1-4 are explanatory diagrams which show a vehicle 10 as one embodiment. FIG. 1 shows a right side view of the vehicle 10, FIG. 2 shows a top view of the vehicle 10, FIG. 3 shows a bottom view of the vehicle 10, and FIG. 4 shows a rear view of the vehicle 10. In FIGS. 2-4, only the components for use in illustration are shown that are included in the vehicle 10 configuration shown in FIG. 1, and the remaining components are omitted. In FIGS. 1-4, six directions DF, DB, DU, DD, DR, and DL are shown. The front direction DF is a direction of forward movement of the vehicle 10, and the back direction DB is opposite to the front direction DF. The upward direction DU is a vertically upward direction, and the downward direction DD is opposite to the upward direction DU. The right direction DR is a right direction viewed from the vehicle 10 traveling in the front direction DF, and the left direction DL is opposite to the right direction DR. All the directions DF, DB, DR, and DL are horizontal directions. The right and left directions DR and DL are perpendicular to the front direction DF.

In this embodiment, this vehicle 10 is a small single-seater vehicle. The vehicle 10 (FIGS. 1 and 2) is a tricycle which includes a vehicle body 90, a single front wheel 12F coupled to the vehicle body 90, and two rear wheels 12L, 12R coupled to the vehicle body 90 and spaced apart in the width direction of the vehicle 10 (i.e. a direction parallel to the right direction DR). The front wheel 12F is steerable, and is located at the center of the vehicle 10 in its width direction. The rear wheels 12L, 12R are unsteerable drive wheels, and are located symmetrically with regard to the center of the vehicle 10 in its width direction.

The vehicle body 90 (FIG. 1) has a main body 20. The main body 20 has a front portion 20a, a bottom portion 20b, a rear portion 20c, and a support portion 20d. The bottom portion 20b is a plate-like portion which extends in the horizontal directions (i.e. directions perpendicular to the upward direction DU). The front portion 20a is a plate-like portion which extends obliquely from the end of the bottom portion 20b in the front direction DF side toward the front direction DF side and upward direction DU side. The rear portion 20c is a plate-like portion which extends obliquely from the end of the bottom portion 20b in the back direction DB side toward the back direction DB side and upward direction DU side. The support portion 20d is a plate-like portion which extends from the top of the rear portion 20c toward the back direction DB. For example, the main body 20 has a metal frame, and panels attached to the frame.

The vehicle body 90 (FIG. 1) further includes a seat 11 attached onto the bottom portion 20b, an accelerator pedal 45 and a brake pedal 46 located in the front direction DF side of the seat 11 on the bottom portion 20b, a controller 110 located below the seat surface of the seat 20 and attached onto the bottom portion 20b, a battery 120 attached to the bottom portion 20b below the controller 110, a steering device 41 attached to the end in the front direction DF side of the front portion 20a, and a shift switch 47 attached to the steering device 41. It should be noted that other members (e.g. roof, headlight, etc.) may be attached to the main body 20 although they are not shown in the figures. The vehicle body 90 includes the members attached to the main body 20.

The accelerator pedal 45 is a pedal for accelerating the vehicle 10. An amount of pressing the accelerator pedal 45 (sometimes referred to as "accelerator operation amount") represents an acceleration force desired by the user. The brake pedal 46 is a pedal for decelerating the vehicle 10. An amount of pressing the brake pedal 46 (sometimes referred to as "brake operation amount") represents a deceleration force desired by the user. The shift switch 47 is a switch for selecting a driving mode of the vehicle 10. In this embodiment, it is possible to select a mode from among four driving modes, "drive," "neutral," "reverse," and "parking." The "drive" mode is a mode for moving forward by driving the drive wheels 12L, 12R, the "neutral" mode is a mode in which the drive wheels 12L, 12R can rotate freely, the "reverse" mode is a mode for moving backward by driving the drive wheels 12L, 12R, the "parking" mode is a mode in which at least one wheel (e.g. rear wheels 12L, 12R) cannot rotate.

The steering device 41 (FIG. 1) is a device that supports the front wheel 12F so that it can be turned about a turning axis Ax1 to the turning direction of the vehicle 10. The steering device 41 includes a front fork 17 rotatably supporting the front wheel 12F, a steering wheel 41a as an operation input unit to which the user inputs his/her desired turning direction and operation amount, a steering motor 65 for turning the front fork 17 (i.e. front wheel 12F) about the turning axis Ax1.

For example, the front fork 17 (FIG. 1) is a telescopic fork with a built-in suspension (coil spring and shock absorber). For example, the steering motor 65 is an electric motor having a stator and a rotor. One of the stator and rotor is attached to the main body 20, and the other is attached to the front fork 17.

The steering wheel 41a (FIG. 1) can rotate about a supporting rod 41ax which extends along the rotational axis of the steering wheel 41a. The rotational direction of the steering wheel 41a (right or left) represents a turning direction desired by the user. The operation amount of the steering wheel 41a with respect to a predetermined orientation corresponding to the straight movement (i.e. rotational angle; hereinafter referred to as "steering wheel angle") represents the magnitude of wheel angle AF (FIG. 2). The wheel angle AF is an angle with respect to the front direction DF of a direction D12 (i.e. a traveling direction of the front wheel 12F) in which the front wheel 12F rolls when the vehicle 10 is viewed in the downward direction DD. This direction D12 is perpendicular to the rotational axis of the front wheel 12F. In this embodiment, "AF=0" indicates that "direction D12=front direction DF," "AF>0" indicates that the direction D12 is deflected toward the right direction DR side, and "AF<0" indicates that the direction D12 is deflected toward the left direction DL side. The controller 110 (FIG. 1) can control the steering motor 65 so that the orientation of the front fork 17 (i.e. the wheel angle AF of the front wheel 12F (FIG. 2)) is changed according to the orientation of the steering wheel 41a when the user changes the orientation of the steering wheel 41a.

In addition, the operation modes of the steering device 41 include a first mode in which the front wheel 12F is turnably supported regardless of the state of the steering wheel 41a, and a second mode in which the wheel angle AF is controlled by the steering motor 65. The first mode can be achieved in any way. For example, by stopping the power supply to the steering motor 65, the front wheel 12F is freed from the control of the steering motor 65 to turn freely. Alternatively, the steering motor 65 may be coupled to the front fork 17 via a clutch. By disengaging the clutch, the front wheel 12F is freed from the control of the steering motor 65 to turn freely.

If the operation mode of the steering device 41 is the second mode, the wheel angle AF corresponds to a so-called steering angle.

As shown in FIG. 1, in this embodiment, when the vehicle 10 is placed on a horizontal ground GL, the turning axis Ax1 of the steering device 41 is tilted obliquely relative to the ground GL, and specifically a direction which is parallel to the turning axis Ax1 and faces the downward direction DD side extends obliquely forward. Therefore, the intersection point P2 between the turning axis Ax1 of the steering device 41 and the ground GL is located in the front direction DF side of the contact point P1 of the front wheel 12F with the ground GL. The distance Lt in the back direction DB between these points P1, P2 is referred to as a trail. A positive trail Lt indicates that the contact point P1 is located in the back direction DB side of the intersection point P2.

The two rear wheels 12L, 12R (FIG. 4) are rotatably supported by a rear wheel support 80. The rear wheel support 80 includes a link mechanism 30, a lean motor 25 mounted on the top of the link mechanism 30, a first support portion 82 attached onto the top of the link mechanism 30, and a second support portion 83 attached to the front of the link mechanism 30 (FIG. 1). In FIG. 1, for purposes of illustration, portions of the link mechanism 30, first support portion 82, and second support portion 83 which are hidden by the rear wheel 12R are also depicted in solid lines. In FIG. 2, for purposes of illustration, the rear wheel support 80, rear wheels 12L, 12R, and connector 75 which are hidden by the main body 20 are depicted in solid lines. In FIGS. 1-3, the link mechanism 30 is depicted simply.

The first support portion 82 (FIG. 4) is located in the upward direction DU side of the link mechanism 30. The first support portion 82 includes a plate-like section which extends parallel to the right direction DR from a location in the upward direction DU side of the left rear wheel 12L to a location in the upward direction DU side of the right rear wheel 12R. The second support portion 83 (FIG. 1, FIG. 2) is located in the front direction DF side of the link mechanism 30 between the left rear wheel 12L and the right rear wheel 12R.

The right rear wheel 12R (FIG. 1) includes a wheel 12Ra with a rim, and a tire 12Rb mounted on the rim of the wheel 12Ra. The wheel 12Ra (FIG. 4) is connected to a right electric motor 51R. The right electric motor 51R has a stator and a rotor (not shown). One of the rotor and stator is attached to the wheel 12Ra, and the other is attached to the rear wheel support 80. The rotational axis of the right electric motor 51R is the same as that of the wheel 12Ra, and is parallel to the right direction DR. The configuration of the left rear wheel 12L is similar to that of the right rear wheel 12R. Specifically, the left rear wheel 12L has a wheel 12La and a tire 12Lb. The wheel 12La is connected to a left electric motor 51L. One of the rotor and stator of the left electric motor 51L is attached to the wheel 12La, and the other is attached to the rear wheel support 80. These electric motors 51L, 51R are in-wheel motors which directly drive the rear wheels 12L, 12R.

The link mechanism 30 (FIG. 4) includes three longitudinal link members 33L, 21, 33R arranged in order toward the right direction DR, and two lateral link members 31U, 31D arranged in order toward the downward direction DD. The longitudinal link members 33L, 21, 33R are parallel to the vertical direction when the vehicle 10 is stopped. The lateral link members 31U, 31D are parallel to the horizontal direction when the vehicle 10 is stopped. The two longitudinal link members 33L, 33R, and the two lateral link members 31U, 31D form a parallelogram link mechanism. The left electric motor 51L is attached to the left longitudinal link member 33L. The right electric motor 51R is attached to the right longitudinal link member 33R. The upper lateral link member 31U couples the upper ends of the longitudinal link members 33L, 33R. The lower lateral link member 31D couples the lower ends of the longitudinal link members 33L, 33R. The center longitudinal link member 21 couples the centers of the lateral link members 31U, 31D. These link members 33L, 33R, 31U, 31D, 21 are mutually coupled rotatably, and their rotational axes are parallel to the front direction DF. On the top of the center longitudinal link member 21, the first support portion 82 and second support portion 83 (FIG. 1) are secured. The link members 33L, 21, 33R, 31U, 31D, and the support portions 82, 83 are, for example, made from metal.

For example, the lean motor 25 is an electric motor having a stator and a rotor. One of the stator and rotor of the lean motor 25 is secured to the center longitudinal link member 21, and the other is secured to the upper lateral link member 31U. The rotational axis of the lean motor 25 is the same as that of the coupling portion of these link members 31U, 21, and is located at the center of the vehicle 10 in its width direction. When the rotor of the lean motor 25 rotates relative to the stator, the upper lateral link member 31U is tilted with respect to the center longitudinal link member 21. This causes the vehicle 10 to lean.

Figure 5:
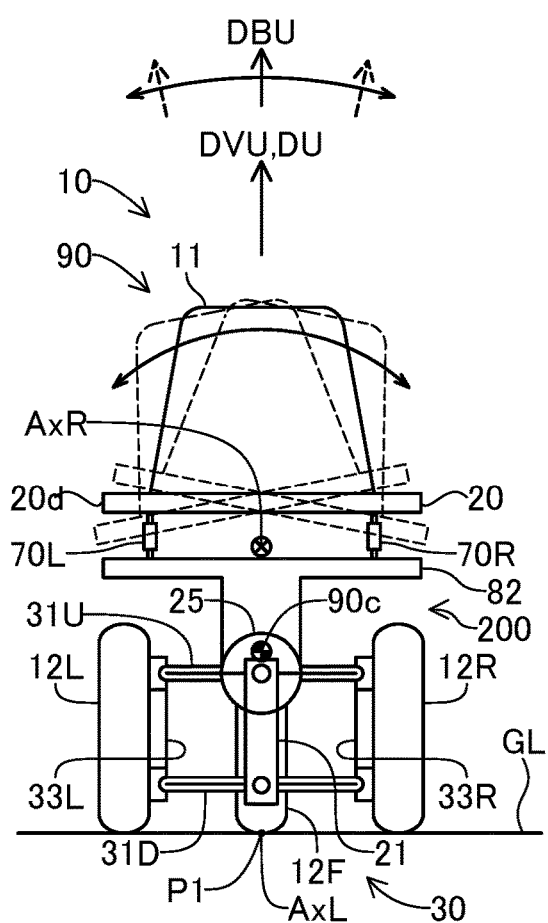
FIGS. 5(A) and 5(B) are schematic diagrams showing states of the vehicle 10.
Figure 5:
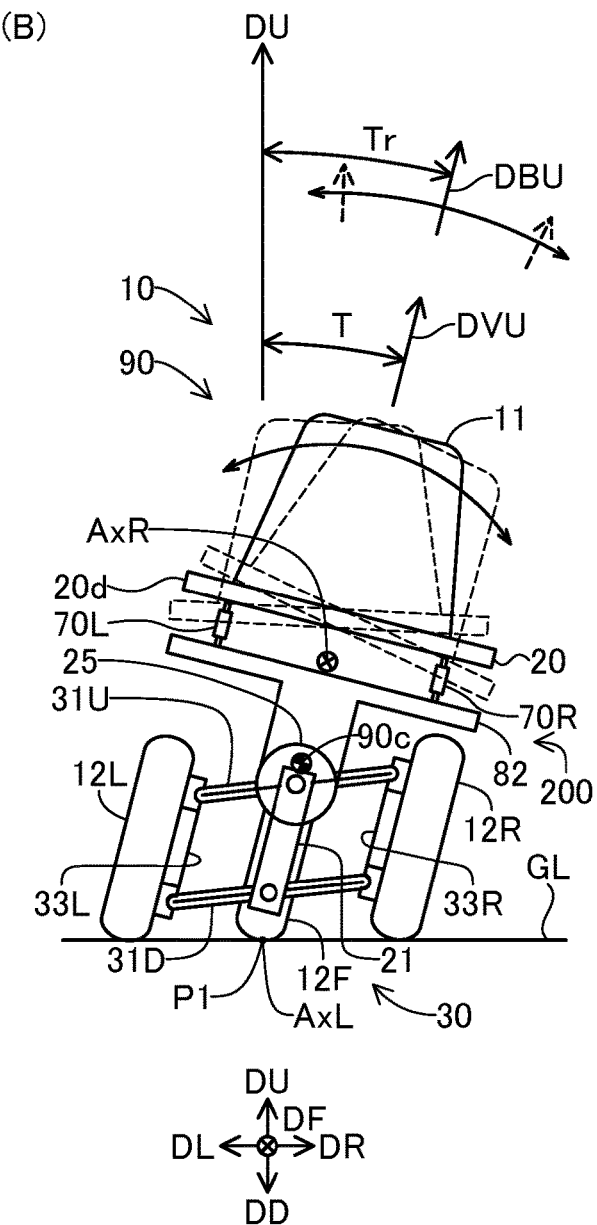

FIG. 5 shows a schematic diagram of the states of the vehicle 10. This figure shows simplified rear views of the vehicle 10. FIG. 5(A) shows the state in which the vehicle 10 stands upright while FIG. 5(B) shows the state in which the vehicle 10 leans. As shown in FIG. 5(A), when the upper lateral link member 31U is perpendicular to the center longitudinal link member 21, all of the wheels 12F, 12L, 12R stand upright relative to the flat ground GL. Also, the whole vehicle 10 including the vehicle body 90 stands upright relative to the ground GL. A vehicle upward direction DVU in the figure represents the upward direction of the vehicle 10. With the vehicle 10 not leaning, the vehicle upward direction DVU is the same as the upward direction DU. It should be noted that the vehicle body 90 is rotatable relative to the rear wheel support 80 as described later. In this embodiment, therefore, the orientation of the rear wheel support 80 (specifically, the orientation of the center longitudinal link member 21 which is the basis of movement of the link mechanism 30) is adopted as the vehicle upward direction DVU.

As shown in FIG. 5(B), when the upper lateral link member 31U is tilted relative to the center longitudinal link member 21, one of the right rear wheel 12R and left rear wheel 12L moves in the vehicle upward direction DVU side while the other moves in an opposite direction side to the vehicle upward direction DVU. That is, the link mechanism 30 and the lean motor 25 change the relative position, in a direction perpendicular to the rotational axis, between the pair of wheels 12L, 12R spaced apart in the width direction. As a result, these wheels 12F, 12L, 12R lean relative to the ground GL while all of the wheels 12F, 12L, 12R have contact with the ground GL. Also, the whole vehicle 10 including the vehicle body 90 leans relative to the ground GL. In the example of FIG. 5(B), the right rear wheel 12R moves in the vehicle upward direction DVU side while the left rear wheel 12L moves in the opposite direction side. As a result, the wheels 12F, 12L, 12R, and thus the whole vehicle 10 including the vehicle body 90 lean to the right direction DR side. As described later, when the vehicle 10 turns to the right direction DR side, the vehicle 10 leans to the right direction DR side. When the vehicle 10 turns to the left direction DL side, the vehicle 10 leans to the left direction DL side.

In FIG. 5(B), the vehicle upward direction DVU is tilted in the right direction DR side relative to the upward direction DU. Hereinafter, when the vehicle 10 is viewed in the front direction DF, the angle between the upward direction DU and the vehicle upward direction DVU is referred to as lean angle T. Where "T>0" indicates a lean to the right direction DR side while "T<0" indicates a lean to the left direction DL side. When the vehicle 10 leans, the vehicle body 90 also leans to substantially the same direction. The lean angle T of the vehicle 10 can be considered as the lean angle T of the vehicle body 90.

The lean motor 25 has a lock mechanism (not shown) for unrotatably locking the lean motor 25. By operating the lock mechanism, the upper lateral link member 31U is unrotatably locked relative to the center longitudinal link member 21. As a result, the lean angle T is fixed. For example, the lean angle T is fixed at zero when the vehicle 10 is parked. Preferably, the lock mechanism is a mechanical mechanism which consumes no electric power when locking the lean motor 25 (and thus the link mechanism 30).

A lean axis AxL is shown in FIGS. 5(A) and (B). The lean axis AxL is located on the ground GL. The vehicle 10 can lean to right and left about the lean axis AxL. The lean axis AxL extends from the back direction DB side toward the front direction DF side. In this embodiment, the lean axis AxL is located on the ground GL, and is a straight line which passes through a contact point P1 between the front wheel 12F and the ground GL, and which is parallel to the front direction DF. The contact point P1 is a gravity center position of the ground contact surface of the front wheel 12F (i.e. the contact area between the front wheel 12F and the ground GL). The gravity center of the area is a position of gravity center on the assumption that its mass is distributed evenly across the area. As described later, when the vehicle 10 turns, the lean motor 25 causes the vehicle 10 to lean toward the turning direction side (i.e. center side of turning). This stabilizes the turning of the vehicle 10. In this manner, the link mechanism 30 for rotatably supporting the rear wheels 12L, 12R, and the lean motor 25 as an actuator for actuating the link mechanism 30 constitute a lean mechanism 200 which leans the vehicle body 90 in the width direction of the vehicle 10. The lean angle T is a lean angle caused by the lean mechanism 200.

The vehicle body 90 (specifically, main body 20) is coupled to the rear wheel support 80 rotatably about a roll axis AxR which extends from the back direction DB side toward the front direction DF side, as shown in FIGS. 1, 5(A), and 5(B). In this embodiment, the main body 20 is coupled to the rear wheel support 80 via a suspension system 70 and the connector 75, as shown in FIGS. 2 and 4. The suspension system 70 has a left suspension 70L and a right suspension 70R. In this embodiment, each of the suspensions 70L, 70R is a telescopic suspension with built-in coil spring and shock absorber. Each suspension 70L, 70R can extend or retract along a central axis 70La, 70Ra (FIG. 4) of each suspension 70L, 70R. When the vehicle 10 stands upright as shown in FIG. 4, the axis of each suspension 70L, 70R is approximately parallel to the vertical direction. The upper ends of the suspensions 70L, 70R are coupled to the support portion 20d of the main body 20 rotatably about a rotational axis parallel to a first axis direction (e.g. the front direction DF). The lower ends of the suspensions 70L, 70R are coupled to the first support portion 82 of the rear wheel support 80 rotatably about a rotational axis parallel to a second axis direction (e.g. the right direction DR). It should be noted that the configuration of the coupling portions between the suspensions 70L, 70R and the other members may be a variety of other configurations (e.g. ball-and-socket joint).

The connector 75 is a rod which extends in the front direction DF as shown in FIGS. 1 and 2. The connector 75 is located at the center of the vehicle 10 in its width direction. The end of the connector 75 in the front direction DF side is coupled to the rear portion 20c of the main body 20. The coupling portion is configured as ball-and-socket joint, for example. The connector 75 can move in any direction relative to the rear portion 20c within a predetermined range. The end of the connector 75 in the back direction DB side is coupled to the second support portion 83 of the rear wheel support 80. The coupling portion is configured as ball-and-socket joint, for example. The connector 75 can move in any direction relative to the second support portion 83 within a predetermined range.

In this manner, the main body 20 (and thus the vehicle body 90) is coupled to the rear wheel support 80 via the suspension system 70 and the connector 75. The vehicle body 90 is movable relative to the rear wheel support 80.

The roll axis AxR of FIG. 1 represents a central axis about which the vehicle body 90 rotates relative to the rear wheel support 80 in the right direction DR or left direction DL. In this embodiment, the roll axis AxR is a straight line which passes through the contact point P1 between the front wheel 12F and the ground GL, and through the vicinity of the connector 75. The vehicle body 90 can rotate in its width direction about the roll axis AxR through the extension/retraction of the suspensions 70L, 70R. It should be noted that in this embodiment, the lean axis AxL about which leaning occurs through the lean mechanism 200 is different form the roll axis AxR.

In FIGS. 5(A) and (B), the vehicle body 90 which rotates about the roll axis AxR is shown in dotted lines. The roll axis AxR in this figure represents a location of the roll axis AxR on a plane which includes the suspensions 70L, 70R, and which is perpendicular to the front direction DF. As shown in FIG. 5(B), the vehicle body 90 can also rotate about the roll axis AxR to the right direction DR and to the left direction DL even when the vehicle 10 leans.

A vehicle body upward direction DBU in the figure represents the upward direction of the vehicle body 90. When the vehicle body 90 is not tilted relative to the rear wheel support 80, the vehicle body upward direction DBU is the same as the vehicle upward direction DVU. As shown in FIG. 5(A), when the vehicle 10 does not lean, and the vehicle body 90 is not tilted relative to the rear wheel support 80, the vehicle body upward direction DBU is the same as the upward direction DU. The vehicle body 90 can rotate toward right and left relative to the rear wheel support 80 about the roll axis AxR. In this case, the vehicle body upward direction DBU can lean to right and left relative to the vehicle upward direction DVU. Such a lean of the vehicle body 90 can occur both in the case of the vehicle 10 not leaning as in FIG. 5(A) and in the case of the vehicle 10 leaning as in FIG. 5(B). For example, the vehicle 10 traveling on the ground GL can oscillate according to irregularities of the ground GL. This oscillation can cause the vehicle body 90 to rotate (and thus oscillate) relative to the rear wheel support 80 in the width direction of the vehicle. Hereinafter, when the vehicle 10 is viewed in the front direction DF, the angle between the upward direction DU and the vehicle body upward direction DBU is referred to as roll angle Tr. Where "Tr>0" indicates a lean to the right direction DR side while "Tr<0" indicates a lean to the left direction DL side. The roll angle Tr can have a value different from the lean angle T.

The vehicle body 90 can rotate in the width direction of the vehicle 10 relative to the vertically upward direction DU (and thus the ground GL) through a rotation by the rear wheel support 80 and a rotation by the suspension system 70 and connector 75. The rotation of the vehicle body 90 in its width direction achieved in an integrated manner in the overall vehicle 10 may be referred to as roll. In this embodiment, the roll of the vehicle body 90 is principally caused through all of the rear wheel support 80, the suspension system 70, and the connector 75. A roll is also caused by a deformation of the members of the vehicle 10, such as the vehicle body 90 and the tires 12Rb, 12Lb.

A gravity center 90c is shown in FIGS. 1, 5(A), and 5(B). This gravity center 90c is a gravity center of the vehicle body 90 under a full load condition. The full load condition means that the vehicle 10 carries an occupant (and possibly a load) so that the gross weight of the vehicle 10 becomes the acceptable gross weight. For example, no maximum loading weight may be specified, but a maximum riding capacity may be specified. In this case, the gravity center 90c is a gravity center when the vehicle 10 is filled to its maximum riding capacity. A reference body weight (e.g. 55 kg) preset corresponding to the maximum riding capacity is adopted as occupant's body weight. Alternatively, a maximum loading weight may be specified in addition to a maximum riding weight. In this case, the gravity center 90c is a gravity center of the vehicle body 90 when the vehicle 10 is filled to its maximum riding capacity and maximum loading capacity.

As shown, the gravity center 90c is located in the downward direction DD side of the roll axis AxR. Therefore, if the vehicle body 90 oscillates about the roll axis AxR, an excessive increase in amplitude of oscillation can be suppressed. In this embodiment, the battery 120, which is a relatively heavy element among the elements of the vehicle body 90 (FIG. 1), is located in a lower position in order to locate the gravity center 90c in the downward direction DD side of the roll axis AxR. Specifically, the battery 120 is secured to the bottom portion 20b, which is the lowest portion among the main body 20 of the vehicle body 90. Therefore, the gravity center 90c can be easily made lower than the roll axis AxR.

Figure 6:
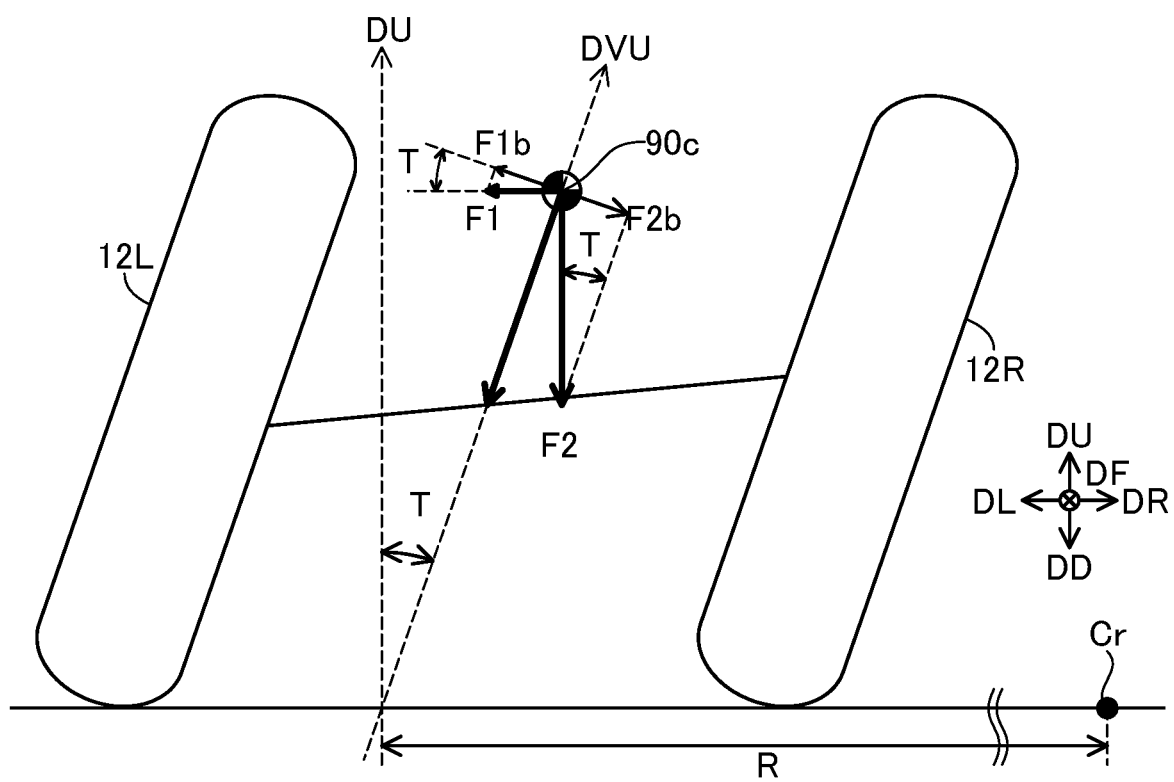
FIG. 6 is an explanatory diagram showing a balance of forces during turning.

FIG. 6 is an explanatory diagram showing a balance of forces during turning. This figure shows a rear view of the rear wheels 12L, 12R during turning to right. As described later, when the turning direction is the right direction, the controller 110 (FIG. 1) can control the lean motor 25 so that the rear wheels 12L, 12R (and thus the vehicle 10) lean relative to the ground GL to the right direction DR.

A first force F1 in the figure is a centrifugal force acting on the vehicle body 90. A second force F2 is a gravity acting on the vehicle body 90. Where the mass of the vehicle body 90 is m (kg), the acceleration of gravity is g (about 9.8 m/s²), the lean angle of the vehicle 10 relative to the vertical direction is T (degree), the velocity of the vehicle 10 during turning is V (m/s), and the turning radius is R (m). The first force F1 and the second force F2 are expressed in Equations 1 and 2, respectively:

$$F1=(m*V^2)/R \qquad \text{(Equation 1)}$$

$$F2=m*g \qquad \text{(Equation 2)}$$

Where * represents a multiplication sign (hereinafter the same shall apply).

In addition, a force F1b in the figure is a component of the first force F1 in a direction perpendicular to the vehicle upward direction DVU. A force F2b is a component of the second force F2 in a direction perpendicular to the vehicle upward direction DVU. The force F1b and the force F2b are expressed in Equations 3 and 4, respectively:

$$F1b=F1*\cos(T) \qquad \text{(Equation 3)}$$

$$F2b=F2*\sin(T) \qquad \text{(Equation 4)}$$

Where "cos( )" is a cosine function, and "sin( )" is a sine function (hereinafter the same shall apply).

The force F1b is a component which causes the vehicle upward direction DVU to be rotated to the left direction DL side while the force F2b is a component which causes the vehicle upward direction DVU to be rotated to the right direction DR side. When the vehicle 10 continues to turn stably with the lean angle T (and furthermore the velocity V and turning radius R) maintained, the relationship between F1b and F2b is expressed in the following equation 5:

$$F1b=F2b \qquad \text{(Equation 5)}$$

By substituting Equations 1-4 as discussed above into Equation 5, the turning radius R is expressed in Equation 6:

$$R=V^2/(g*\tan(T)) \qquad \text{(Equation 6)}$$

Where "tan( )" is a tangent function (hereinafter the same shall apply). Equation 6 is established independently of the mass m of the vehicle body 90.

Figure 7:
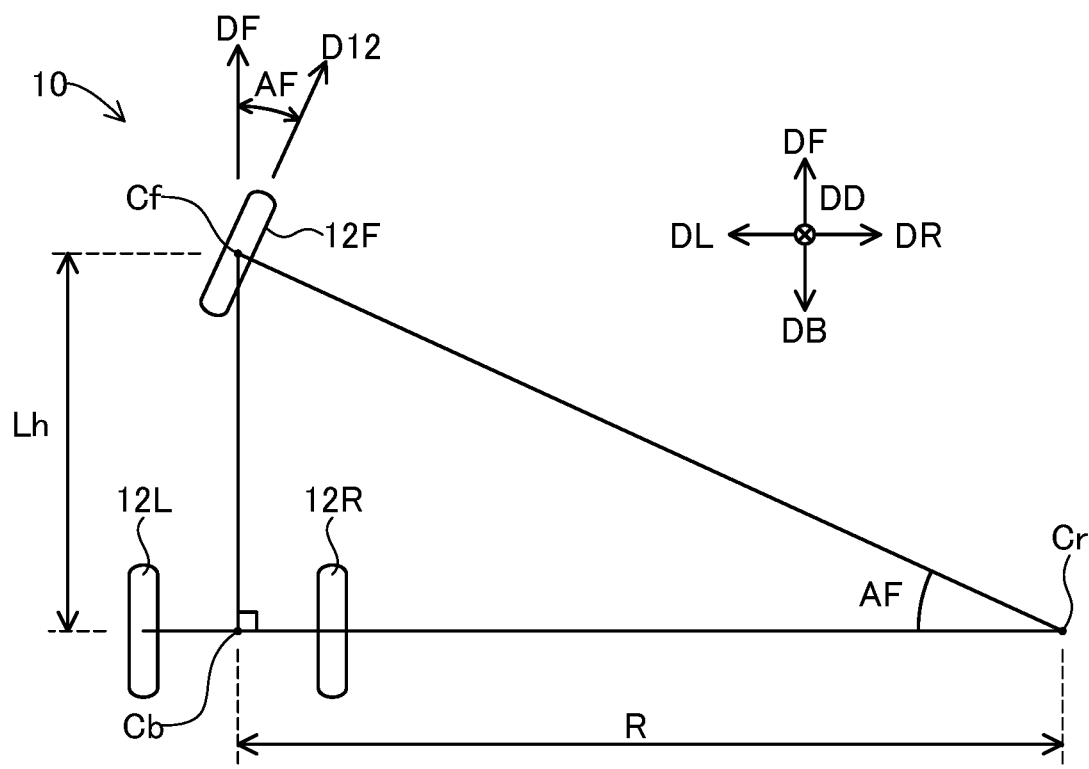
FIG. 7 is an explanatory diagram showing a simplified relationship between a wheel angle AF and a turning radius R.

FIG. 7 is an explanatory diagram showing a simplified relationship between the wheel angle AF and the turning radius R. This figure shows the wheels 12F, 12L, 12R viewed in the downward direction DD. In the figure, the front wheel 12F turns to the right direction DR, and thus the vehicle 10 turns to the right direction DR. A front center Cf in the figure is the center of the front wheel 12F. The front center Cf is located on the rotational axis of the front wheel 12F. The front center Cf is located at the approximately same position as the contact point P1 (FIG. 1). A rear center Cb is the center between the two rear wheels 12L, 12R. The rear center Cb is located at the middle between the rear wheels 12L, 12R on the rotational axis of the rear wheels 12L, 12R. A center Cr is the turning center (referred to as turning center Cr). A wheelbase Lh is the distance between the front center Cf and the rear center Cb in the front direction DF. As shown in FIG. 1, the wheelbase Lh is the distance between the rotational axis of the front wheel 12F and that of the rear wheels 12L, 12R in the front direction DF.

As shown in FIG. 7, the front center Cf, rear center Cb, and turning center Cr form a right angled triangle. The internal angle of the vertex Cb is 90 degrees. The internal angle of the vertex Cr is equal to the wheel angle AF. Therefore, the relationship between the wheel angle AF and the turning radius R is expressed in Equation 7:

$$AF=\arctan(Lh/R) \qquad \text{(Equation 7)}$$

Where "arctan( )" is an inverse function of tangent function (hereinafter the same shall apply).

It should be noted that there are a variety of difference between the actual behavior of the vehicle 10 and the simplified behavior in FIG. 7. For example, the actual wheels 12F, 12L, 12R can slip relative to the ground GL. In addition, the actual rear wheels 12L, 12R lean. Therefore, the actual turning radius may be different from the turning radius R in Equation 7. However, Equation 7 can be used as a good approximate equation which represents the relationship between the wheel angle Af and the turning radius R.

When the vehicle 10 leans to the right direction DR side during its forward movement as shown in FIG. 5(B), the gravity center 90c of the vehicle body 90 moves to the right direction DR side, and thus the traveling direction of the vehicle 10 changes to the right direction DR side. Also, in this embodiment, the vehicle 10 has a positive trail Lt as described with regard to FIG. 1. Therefore, when the vehicle 10 leans to the right direction DR side during its forward movement, the orientation of the front wheel 12F (i.e. wheel angle AF) can spontaneously turn to the new traveling direction of the vehicle 10, that is, its lean direction (right direction DR in the example of FIG. 5(B)). When the steering device 41 operates in the first mode (the front wheel 12F is turnable), the orientation of the front wheel 12F spontaneously turns to the lean direction following beginning of change in the lean angle T. Thus, the vehicle 10 turns toward the lean direction.

In addition, the behavior of the vehicle 10 is stabilized because the forces F1b, F2b (FIG. 6, Equation 5) balance each other when the turning radius is equal to the turning radius R expressed in Equation 6 discussed above. The vehicle 10 turning at the lean angle T will turn in the turning radius R expressed in Equation 6. In addition, the orientation of the front wheel 12F (wheel angle AF) spontaneously faces the traveling direction of the vehicle 10 because the vehicle 10 has a positive trail Lt. Therefore, when the vehicle 10 turns at the lean angle T, the orientation of the turnable front wheel 12F (wheel angle AF) can settle at an orientation of the wheel angle AF specified based on the turning radius R expressed in Equation 6, and Equation 7. In this manner, the wheel angle AF changes following a lean of the vehicle body 90.

Figure 8:
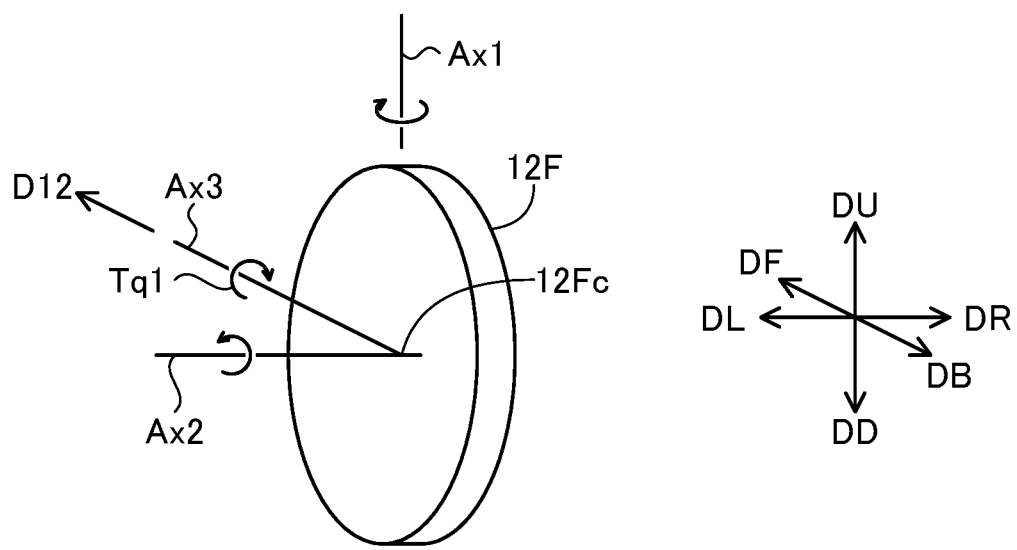
FIG. 8 is an explanatory diagram illustrating forces which act on a rotating front wheel 12F.

Furthermore, in this embodiment, when the vehicle body 90 leans, the front wheel 12F is subject to a force that rotates the wheel angle AF to the lean direction independently of the trail Lt. FIG. 8 is an explanatory diagram illustrating forces which act on the rotating front wheel 12F. This figure shows a perspective view of the front wheel 12F. In the example of FIG. 8, the direction D12 of the front wheel 12F is the same as the front direction DF. A rotational axis Ax2 is a rotational axis of the front wheel 12F. When the vehicle 10 moves forward, the front wheel 12F rotates about this rotational axis Ax2. The figure shows the turning axis Ax1 of the steering device 41 (FIG. 1) and a front axis Ax3. The turning axis Ax1 extends from the upward direction DU side to the downward direction DD side. The front axis Ax3 is an axis which passes through the gravity center 12Fc of the front wheel 12F and is parallel to the direction D12 of the front wheel 12F. It should be noted that the rotational axis Ax2 of the front wheel 12F also passes through the gravity center 12Fc of the front wheel 12F.

As described with regard to FIG. 1 etc., in this embodiment, the steering device 41, which supports the front wheel 12F, is secured to the vehicle body 90. Therefore, when the vehicle body 90 leans, the steering device 41 leans along with the vehicle body 90, and thus the rotational axis Ax2 of the front wheel 12F will also lean to the same direction in a similar fashion. When the vehicle body 90 of the moving vehicle 10 leans to the right direction DR side, the front wheel 12F, which rotates about the rotational axis Ax2, is subject to a torque Tq1 (FIG. 8) that causes the front wheel 12F to lean to the right direction DR side. This torque Tq1 includes a component of force that acts to lean the front wheel 12F about the front axis Ax3 to the right direction DR. Such a movement of a rotating object when an external torque is applied to the object is known as precession movement. For example, the rotating object turns about an axis perpendicular to the rotational axis and the axis of the external torque. In the example of FIG. 8, the application of the torque Tq1 causes the rotating front wheel 12F to turn about the turning axis Ax1 of the steering device 41 to the right direction DR side. In this manner, due to the angular momentum of the rotating front wheel 12F, the direction of the front wheel 12F (i.e. wheel angle AF) changes following a lean of the vehicle body 90.

The above description refers to the case where the vehicle 10 leans to the right direction DR side. The above discussion is also applicable to the case where the vehicle 10 leans to the left direction DL side.

When the vehicle 10 repeatedly turns to right and to left, the lean angle T oscillates between right and left. This also causes the vehicle body upward direction DBU, which represents the orientation of the vehicle body 90, to oscillate between right and left. The wheel angle AF can oscillate following the oscillation of the vehicle body 90. Specifically, the wheel angle AF can oscillate following the oscillation of the roll angle Tr (FIGS. 5(A) and 5(B)) of the vehicle body 90.

Figure 9:
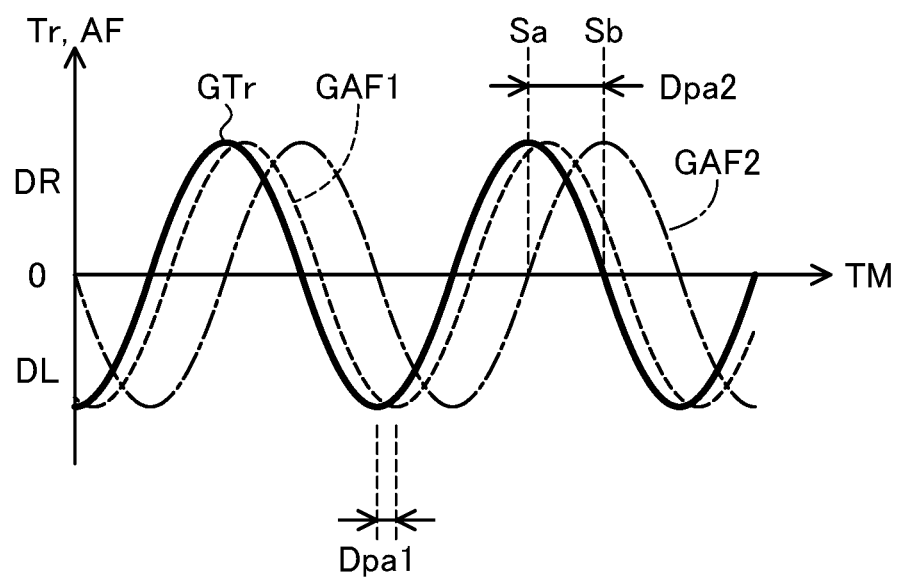
FIG. 9 is a graph showing example oscillations of a roll angle Tr and the wheel angle AF.

FIG. 9 is a graph showing example oscillations of the roll angle Tr and the wheel angle AF. The horizontal axis represents time TM, and the vertical axis represents the roll angle Tr and wheel angle AF. The plot GTr represents an example oscillation of the roll angle Tr, and the plots GAF1, GAF2 represent respective example oscillations of the wheel angle AF. As indicated by these plots GAF1, GAF2, the wheel angle AF oscillates following the oscillation of the roll angle Tr. In addition, the oscillation of the wheel angle AF has a phase delay relative to that of the roll angle Tr. Delay phase differences Dpa1, Dpa2 in the figure represent amounts by which the phase of the wheel angle AF is delayed from that of the roll angle Tr. The delay phase difference Dpa1 of the first plot GAF1 is smaller than the delay phase difference Dpa2 of the second plot GAF2. It should be noted that in order to make the graph easy to read, the wheel angle AF and the roll angle Tr are shown as having the same amplitude in this figure. In practice, the amplitude of the wheel angle AF can differ from that of the roll angle Tr.

The delayed change of the wheel angle AF can result from a variety of causes. For example, the change in orientation (i.e. wheel angle AF) of the front wheel 12F is suppressed by an inertia moment of a member (e.g. front fork 17) which turns about the turning axis Ax1 of the steering device 41 along with the front wheel 12F. In addition, the change in the wheel angle AF is also suppressed by a resistance (e.g. friction) to the turning about the turning axis Ax1. These can cause the change in the wheel angle AF to be delayed relative to that in the roll angle Tr. Furthermore, the change in traveling direction of the vehicle 10 is suppressed by an inertia moment (sometimes referred to as yaw moment) relating to a turn of the vehicle 10. This can cause the change in traveling direction to be delayed relative to that in the roll angle Tr. Accordingly, the change in the wheel angle AF can be delayed due to the delayed change in traveling direction.

It should be noted that the vehicle body 90 can oscillate even if the lean angle T is maintained at a constant value without any oscillation. For example, even if the vehicle 10 goes straight with its lean angle maintained at zero, the vehicle body 90 can oscillate right and left due to small irregularities of the ground GL. Such an oscillation of the vehicle body 90 can cause the wheel angle AF to oscillate. And, the oscillation of the wheel angle AF can have a phase delay relative to that of the roll angle Tr as described with regard to FIG. 9.

Figure 10:
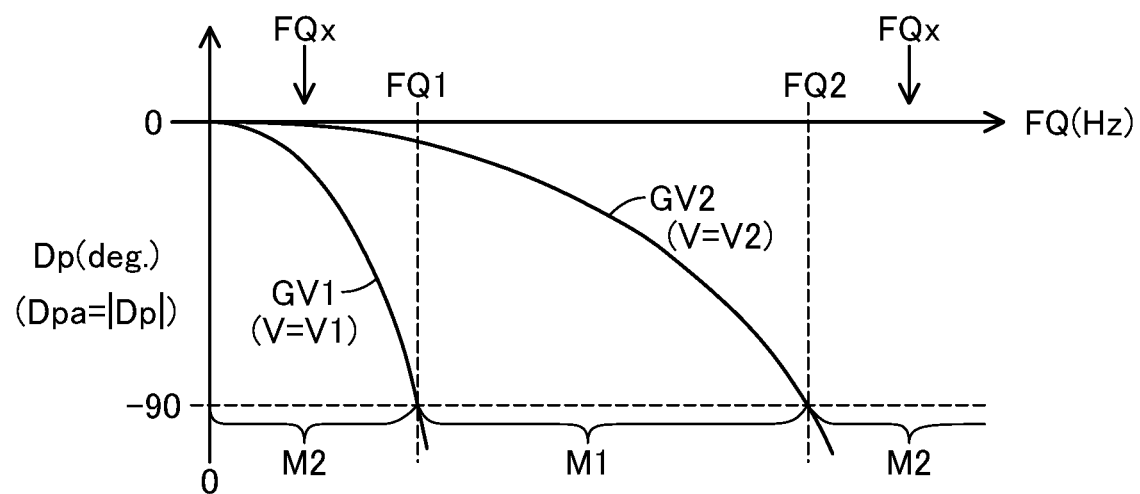
FIG. 10 is a graph showing correspondences between a frequency FQ of the roll angle Tr and a phase difference Dp of oscillations of the roll angle Tr and the wheel angle AF.

FIG. 10 is a graph showing correspondences between a frequency FQ of the roll angle Tr and a phase difference Dp of oscillations of the roll angle Tr and the wheel angle AF. The horizontal axis represents the frequency FQ (in Hz), and the vertical axis represents the phase difference Dp (in degree). Dp=0 indicates that the oscillations of the wheel angle AF and roll angle Tr have the same phase. Dp<0 indicates that the oscillation of the wheel angle AF is delayed relative to that of the roll angle Tr. The larger the absolute value of the phase difference Dp is, the more the oscillation of the wheel angle AF is delayed relative to that of the roll angle Tr. Hereinafter, the absolute value of the phase difference Dp may be referred to as delay phase difference Dpa.

In this figure, a first plot GV1 shows a correspondence when the velocity V of the vehicle 10 (sometimes referred to as vehicle velocity V) is at a first velocity V1 that is larger than zero, and a second plot GV2 shows a correspondence when the vehicle velocity V is at a second velocity V2 that is larger than the first velocity V1.

As shown in the figure, both the two plots GV1, GV2 indicate that the larger the frequency FQ is, the larger the delay phase difference Dpa in the case of the equal vehicle velocity V. The reason is as follows. The roll angle Tr changes more rapidly in the case of the larger frequency FQ than in the case of the smaller frequency FQ. Therefore, the wheel angle AF is required to change rapidly in order to achieve a small delay phase difference Dpa. However, such a rapid change in the wheel angle AF is suppressed due to a variety of causes as described above. Therefore, the delay phase difference Dpa is larger in the case of the larger frequency FQ than in the case of the smaller frequency FQ.

In addition, as shown in the figure, in the case of the equal frequency FQ, the delay phase difference Dpa at the relatively higher second velocity V2 (shown by the second plot GV2) is smaller than the delay phase difference Dpa at the relatively lower first velocity V1 (shown by the first plot GV1). The reason is as follows. As described with regard to FIG. 8, the front wheel 12F is subject to a force that turns the front wheel 12F about the turning axis Ax1 to the right direction DR side when the vehicle body 90 leans to the right direction DR side. The higher the vehicle velocity V is, the larger the angular momentum of the front wheel 12F is. Therefore, the higher vehicle velocity V results in the greater force that turns the front wheel 12F about the turning axis Ax1 to the right direction DR. Therefore, the orientation of the wheel 12F (i.e. wheel angle AF) can change following to the roll angle Tr more readily in the case of the higher vehicle velocity V than in the case of the lower vehicle velocity V. As a result, in the case of the equal frequency FQ, the higher the vehicle velocity V is, the smaller the delay phase difference Dpa is.

When the delay phase difference Dpa is equal to 90 degrees, that is, the phase difference Dp is equal to −90 degrees, the front wheel 12F which turns between right and left can increase the oscillation amplitude of the vehicle body 90. The second plot GAF2 in FIG. 9 shows the case where the delay phase difference Dpa2 is equal to 90 degrees. In the figure, two states Sa, Sb are shown. In the first state Sa, the vehicle body 90 leans to the right direction DR at its maximum amplitude (maximum roll angle Tr). In the second state Sb, the roll angle Tr has become equal to zero degree by the vehicle body 90 rolling toward the left direction DL out of the first state Sa. In this second state Sb, the angular velocity of oscillation of the vehicle body 90 is the highest. Meanwhile, in this second state Sb, the wheel angle AF (in the second plot GAF2) faces the right direction DR at its maximum amplitude (maximum wheel angle AF) because the wheel angle AF is delayed by 90 degrees relative to the roll angle Tr. The front wheel 12F at such a wheel angle AF causes the vehicle 10 to turn to the right direction DR, and thus the vehicle body 90 is subject to a centrifugal force toward the left direction DL. The vehicle body 90 rolling toward left at the maximum angular velocity in this manner is also subject to a centrifugal force toward the left direction DL. As a result, the oscillation amplitude of the vehicle body 90 can be increased. In particular, the oscillation amplitude of the vehicle body 90 tends to increase when the frequency of the roll angle Tr is the same as the natural frequency of the vehicle body 90. The increase in the oscillation amplitude of the vehicle body 90 may deteriorate the driving stability of the vehicle 10. For example, the vehicle body 90 may oscillate unintentionally during a drive.

The natural frequency of the vehicle body 90 is obtained in the following way, for example. The vehicle 10 is stopped on a horizontal ground GL. The lean angle T is maintained at zero degree. In this situation, a force toward the right direction DR is applied to the vehicle body 90 to lean the vehicle body 90 to the right direction DR side. Then, the application of the force is stopped to allow the vehicle body 90 to move freely. Accordingly, the vehicle body 90 oscillates between right and left. The frequency of this oscillation can be adopted as its natural frequency.

Reference frequencies FQ1, FQ2 in FIG. 10 represent frequencies at which the phase difference Dp is equal to −90 degrees. The first reference frequency FQ1 is a frequency when the vehicle velocity V is at the first velocity V1, and the second reference frequency FQ2 is a frequency when the vehicle velocity V is at the second velocity V2 (hereinafter referred to as first frequency FQ1, second frequency FQ2 simply). In this embodiment, when the vehicle velocity V is within a velocity range from not less than the first velocity V1 to not more than the second velocity V2, the controller 110 (FIG. 1) operates the steering device 41 in the first mode M1 in which the wheel angle AF changes following a lean of the vehicle body 90. When the vehicle velocity V is lower than the first velocity V1 or when the vehicle velocity V is higher than the second velocity V2, the controller 110 operates the steering device 41 in the second mode M2 in which the wheel angle AF is controlled actively according to the operation amount of the steering wheel 41a. In this case, the frequency FQ at which the phase difference Dp is equal to −90 degrees is between the first frequency FQ1 and the second frequency FQ2, inclusive, in the first mode M1. Therefore, when the natural frequency FQx of the vehicle body 90 is smaller than the first frequency FQ1 or larger than the second frequency FQ2, it is possible to avoid the frequency FQ of the vehicle body 90 being the natural frequency even if the phase difference Dp become equal to −90 degrees. That is, it is possible to suppress an increase in the oscillation amplitude of the vehicle body 90.

The first velocity V1 is equal to 15 km/hour, for example, while the second velocity V2 is equal to 60 km/hour, for example. The reference frequencies FQ1, FQ2 corresponding to the velocities V1, V2 respectively can be obtained experimentally. And, in this embodiment, the vehicle 10 is configured such that the natural frequency FQx of the vehicle body 90 is smaller than the first frequency FQ1 or larger than the second frequency FQ2. A variety of methods may be adopted in order to adjust the natural frequency. In order to increase the natural frequency, it is possible to increase spring constants of the suspensions 70L, 70R (FIG. 4), for example. In order to decrease the natural frequency, it is possible to decrease spring constants of the suspensions 70L, 70R, for example.

Figure 11:
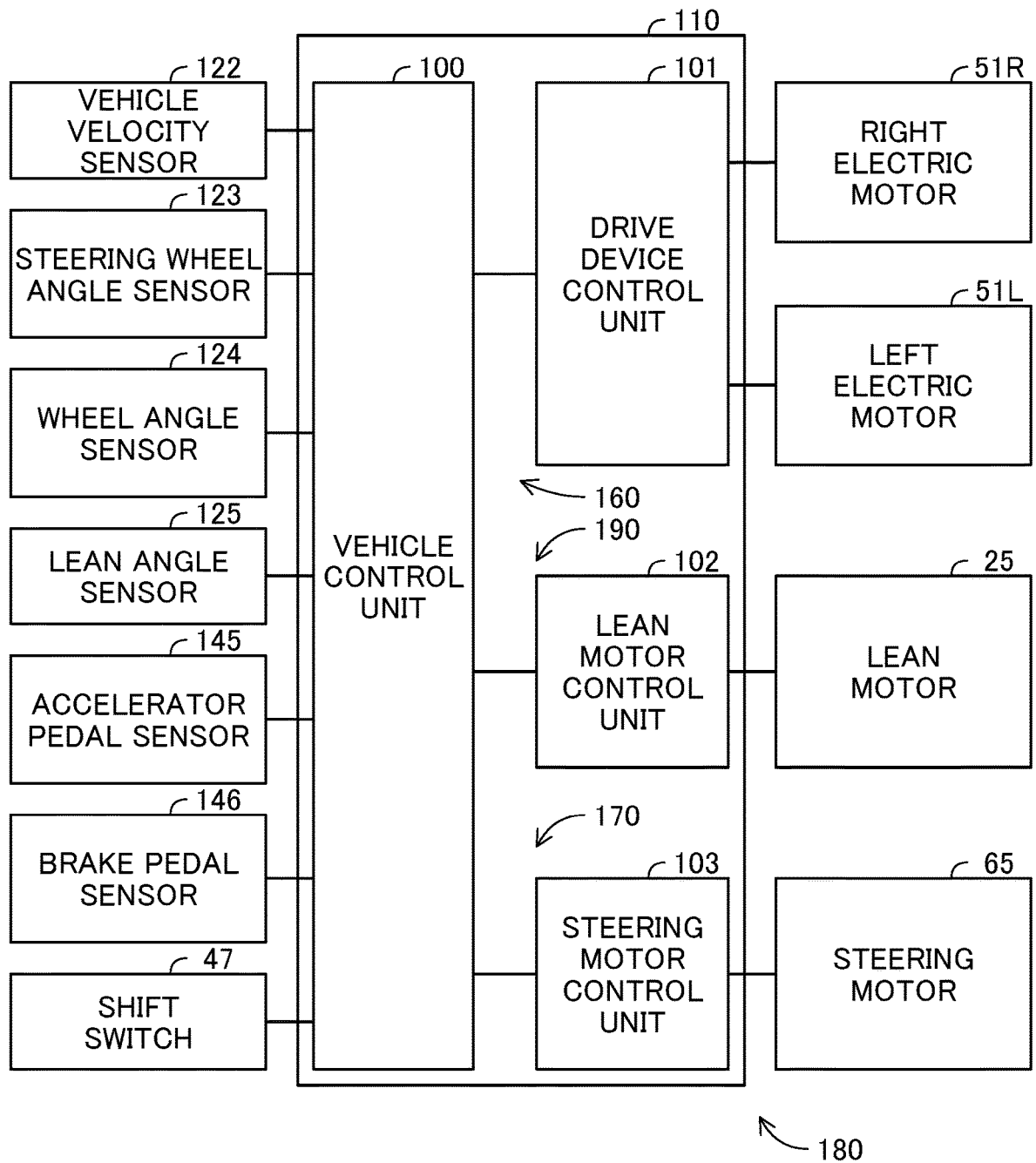
FIG. 11 is a block diagram showing a configuration relating to control of the vehicle 10.

FIG. 11 is a block diagram showing the configuration relating to control of the vehicle 10. The vehicle 10 includes as components for the control a vehicle velocity sensor 122, a steering wheel angle sensor 123, a wheel angle sensor 124, a lean angle sensor 125, an accelerator pedal sensor 145, a brake pedal sensor 146, a shift switch 47, a controller 110, a right electric motor 51R, a left electric motor 51L, a lean motor 25, and a steering motor 65.

The vehicle velocity sensor 122 is a sensor for detecting a vehicle velocity of the vehicle 10. In this embodiment, the vehicle velocity sensor 122 is attached on the lower end of the front fork 17 (FIG. 1) to detect a rotational rate of the front wheel 12F, i.e. vehicle velocity.

The steering wheel angle sensor 123 is a sensor for detecting an orientation of the steering wheel 41a (i.e. steering wheel angle). "Steering wheel angle=0" indicates straight movement, "steering wheel angle>0" indicates a right turn, and "steering wheel angle<0" indicates left turn. The steering wheel angle represents a wheel angle AF desired by the user, i.e. a target value of wheel angle AF. In this embodiment, the steering wheel angle sensor 123 is attached to the supporting rod 41ax secured to the steering wheel 41a (FIG. 1).

The wheel angle sensor 124 is a sensor for detecting a wheel angle AF of the front wheel 12F. In this embodiment, the wheel angle sensor 124 is attached to the steering motor 65 (FIG. 1).

The lean angle sensor 125 is a sensor for detecting a lean angle T. The lean angle sensor 125 is attached to the lean motor 25 (FIG. 4). As discussed above, the orientation of the upper lateral link member 31U relative to the center longitudinal link member 21 corresponds to the lean angle T. The lean angle sensor 125 detects the orientation of the upper lateral link member 31U relative to the center longitudinal link member 21, i.e. the lean angle T.

The accelerator pedal sensor 145 is a sensor for detecting an accelerator operation amount. In this embodiment, the accelerator pedal sensor 145 is attached to the accelerator pedal 45 (FIG. 1). The brake pedal sensor 146 is a sensor for detecting a brake operation amount. In this embodiment, the brake pedal sensor 146 is attached to the brake pedal 46 (FIG. 1).

It should be noted that each sensor 122, 123, 124, 125, 145, 146 is configured using a resolver or encoder, for example.

The controller 110 includes a vehicle control unit 100, a drive device control unit 101, a lean motor control unit 102, and a steering motor control unit 103. The controller 110 operates with electric power from the battery 120 (FIG. 1). The control units 100, 101, 102, 103 each has a computer. Each computer includes a processor (e.g. CPU), a volatile memory (e.g. DRAM), and a non-volatile memory (e.g. flash memory). The non-volatile memory stores in advance a program for operating the respective control unit. The processor performs a variety of processes by executing the programs.

The processor of the vehicle control unit 100 receives signals from the sensors 122, 123, 124, 125, 145, 146, and from the shift switch 47, and then controls the vehicle 10 according to the received signals. Specifically, the processor of the vehicle control unit 100 controls the vehicle 10 by outputting instructions to the drive device control unit 101, the lean motor control unit 102, and the steering motor control unit 103 (described in detail later).

The processor of the drive device control unit 101 controls the electric motors 51L, 51R according to the instruction from the vehicle control unit 100. The processor of the lean motor control unit 102 controls the lean motor 25 according to the instruction from the vehicle control unit 100. The processor of the steering motor control unit 103 controls the steering motor 65 according to the instruction from the vehicle control unit 100. These control units 101, 102, 103 each have an electric circuit (e.g. inverter circuit) which supplies the electric motors 51L, 51R, 25, 65 to be controlled with electric power from the battery 120.

Hereinafter, a phrase "a processor of a control unit performs a process" is expressed briefly as a phrase "a control unit performs a process."

Figure 12:
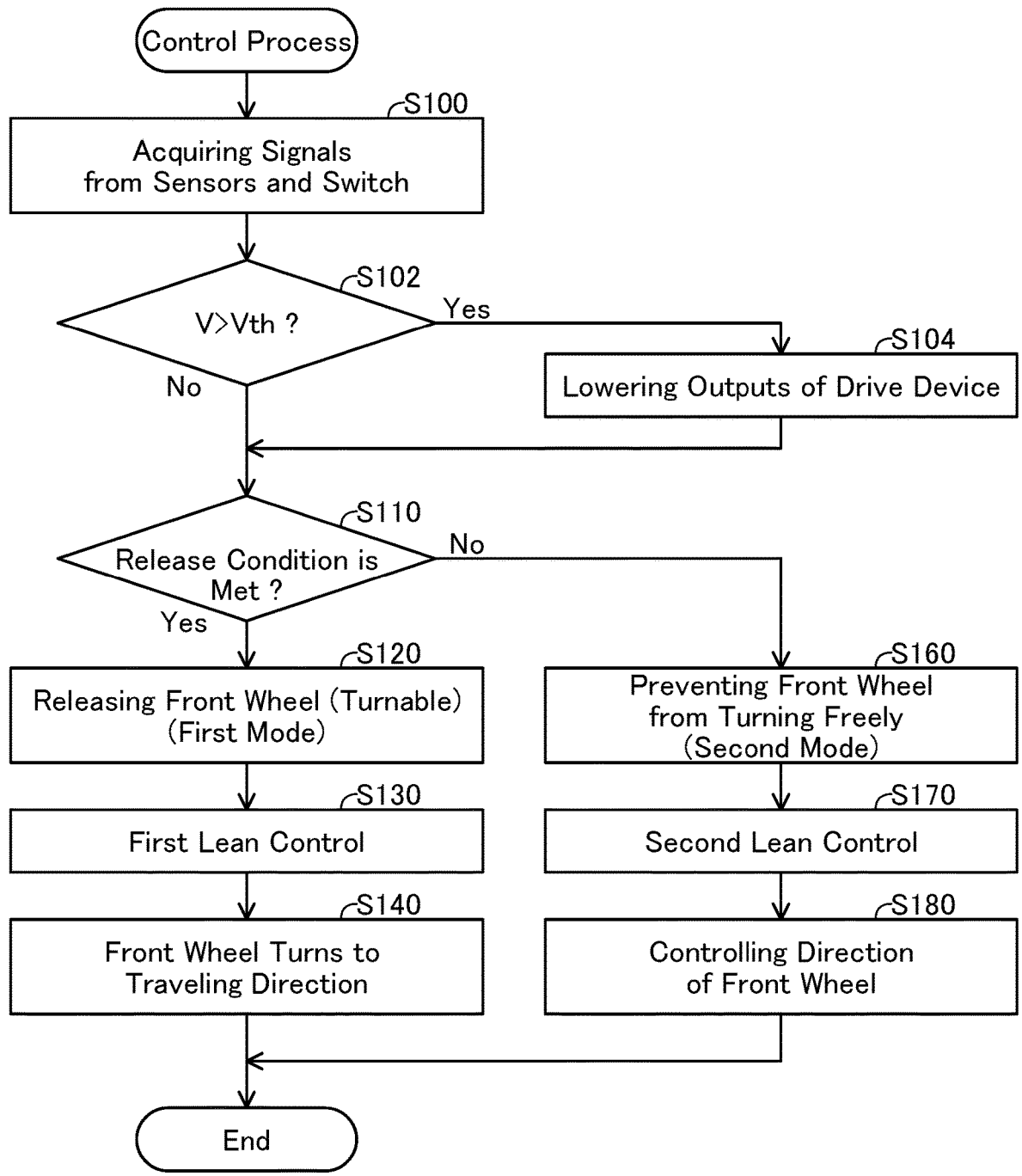
FIG. 12 is a flowchart showing an example control process.

FIG. 12 is a flowchart showing an example control process performed by the controller 110 (FIG. 11). The flowchart of FIG. 12 shows a procedure for controlling the rear wheel support 80 and the steering device 41. In the embodiment shown in FIG. 12, when the vehicle velocity V is within a velocity range (hereinafter referred to as allowable velocity range) from not less than the first velocity V1 to not more than the second velocity V2, the controller 110 operates the steering device 41 in the first mode M1 in which the front wheel 12F is turnably supported. In this first mode, the wheel angle AF of the front wheel 12F is allowed to change following a lean of the vehicle body 90. When the vehicle velocity V is out of the allowable velocity range, that is, the vehicle velocity V is lower than the first velocity V1 or higher than the second velocity V2, the controller 110 operates the steering device 41 in the second mode in which the orientation of the front wheel 12F (i.e. wheel angle AF) is controlled actively. The controller 110 also perform lean control for leaning the vehicle 10 both in the case of the vehicle velocity V being within the allowable velocity range and in the case of the vehicle velocity V being out of the allowable velocity range. In FIG. 12, each process step has a reference number of an alphabet "S" followed by a numeral.

In S100, the vehicle control unit 100 acquires signals from the sensors 122, 123, 124, 125, 145, 146, and from the shift switch 47. This allows the vehicle control unit 100 to identify the velocity V, steering wheel angle, wheel angle AF, lean angle T, accelerator operation amount, brake operation amount, and driving mode.

In S102, the vehicle control unit 100 determines whether or not the vehicle velocity V exceeds a predetermined upper limit velocity Vth. If the vehicle velocity V exceeds the upper limit velocity Vth (S102: Yes), in S104, the vehicle control unit 100 supplies the drive device control unit 101 with an instruction for lowering the outputs of the electric motors 51R, 51L. The drive device control unit 101 lowers the powers to be supplied to the electric motors 51R, 51L according to the instruction. This causes the outputs of the electric motors 51R, 51L to be lowered, and thus it is suppressed that the vehicle velocity V exceeds the upper limit velocity Vth to become excessively high. The vehicle control unit 100 proceeds to S110 after supplying the drive device control unit 101 with the instruction. If the vehicle velocity V does not exceed the upper limit velocity Vth (S102: No), the vehicle control unit 100 skips S104, and then proceeds to S110.

In S110, the vehicle control unit 100 determines whether or not a condition (hereinafter referred to as "release condition") is met for operating the steering device 41 in the first mode (in which the front wheel 12F is turnable). In this embodiment, the release condition is that 'the driving mode is "drive" or "neutral," and the velocity V is within the allowable velocity range.' When the vehicle velocity V is within the allowable velocity range during the vehicle 10 moving forward, the release condition is met.

If the release condition is met (S110: Yes), in S120, the vehicle control unit 100 supplies the steering motor control unit 103 with an instruction for operating the steering device 41 in the first mode. The steering motor control unit 103 stops the power supply to the steering motor 65 according to the instruction. This causes the steering motor 65 to become rotatable, and thus the steering device 41 turnably supports the front wheel 12F about the turning axis Ax1.

In S130, the vehicle control unit 100 identifies a first target lean angle T1 mapped to the steering wheel angle. In this embodiment, the first target lean angle T1 is a value obtained by multiplying the steering wheel angle (in degree) by a predetermined coefficient (e.g. 30/60). It should be noted that instead of the proportional relationship, a variety of relationships such that the larger the absolute value of steering wheel angle is, the larger is the absolute value of first target lean angle T1 may be adopted as a correspondence between the steering wheel angle and the first target lean angle T1. Information which represents the correspondence between the steering wheel angle and the first target lean angle T1 is stored in advance within the non-volatile memory of the vehicle control unit 100. The vehicle control unit 100 references to this information to identify the first target lean angle T1 corresponding to the steering wheel angle according to the predetermined correspondence in the referenced information.

It should be noted that as described above, Equation 6 represents the correspondence among the lean angle T, the velocity V, and the turning radius R, and Equation 7 represents the correspondence between the turning radius R and the wheel angle AF. These Equations 6 and 7 can be combined to identify the correspondence among the lean angle T, the velocity V, and the wheel angle AF. It may be considered that the correspondence between the steering wheel angle and the first target lean angle T1 maps the steering wheel angle to the wheel angle AF via the correspondence among the lean angle T, the velocity V, and the wheel angle AF (where the wheel angle AF can be vary depending upon the velocity V).

The vehicle control unit 100 supplies the lean motor control unit 102 with an instruction for controlling the lean motor 25 so that the lean angle T is equal to the first target lean angle T1. According to the instruction, the lean motor control unit 102 drives the lean motor 25 so that the lean angle T is equal to the first target lean angle T1. This causes the lean angle T of the vehicle 10 to be changed to the first target lean angle T1 mapped to the steering wheel angle. In this manner, the vehicle control unit 100 and the lean motor control unit 102 serve as a lean control unit (sometimes referred to as lean control unit 190) for controlling the link mechanism 30 and lean motor 25 which lean the vehicle body 90.

In subsequent S140, as described above, the front wheel 12F spontaneously turns to a direction of the wheel angle AF calculated based on the turning radius R expressed in Equation 6, and Equation 7. The front wheel 12F begins to spontaneously turn after beginning of change in the lean angle T. That is, the wheel angle AF changes following a lean of the vehicle body 90. Then, the process of FIG. 8 ends. The controller 110 repeatedly performs the process of FIG. 8. If the release condition is met, the controller 110 continues to operate the steering device 41 in the first mode, and control the lean angle T in S130. As a result, the vehicle 10 runs toward a traveling direction appropriate to the steering wheel angle.

If the release condition is not met (S110: No), the vehicle control unit 100 proceeds to S160. It should be noted that in this embodiment, any of the following cases does not meet the release condition:
1) the driving mode is "drive" or "neutral," and the velocity V is out of the allowable velocity range;
2) the driving mode is "parking"; and
3) the driving mode is "reverse."

In S160, the vehicle control unit 100 supplies the steering motor control unit 103 with an instruction for operating the steering device 41 in the second mode. In this embodiment, the steering motor control unit 103 supplies power to the steering motor 65 according to the instruction. In this embodiment, the steering motor control unit 103 controls the steering motor 65 so that the wheel angle AF is maintained at a target wheel angle determined in S180 to be repeated (described in detail later). The front wheel 12F (wheel angle AF) is prevented by the steering motor 65 from being free to turn.

In S170, the vehicle control unit 100 identifies the first target lean angle T1 in a similar manner to S130. Then, the vehicle control unit 100 supplies the lean motor control unit 102 with an instruction for controlling the lean motor 25 so that the lean angle T is equal to the first target lean angle T1. According to the instruction, the lean motor control unit 102 drives the lean motor 25 so that the lean angle T is equal to the first target lean angle T1. This causes the lean angle T of the vehicle 10 to be changed to the first target lean angle T1.

It should be noted that during lower velocity (when the velocity V is lower than the first velocity V1), the lean angle T may be controlled so that it becomes a second target lean angle T2 having an absolute value smaller than that of the first target lean angle T1. The second target lean angle T2 may be expressed in Equation 8:

$$T2=(V/V1)T1 \tag{Equation 8}$$

The second target lean angle T2 expressed in Equation 8 changes in proportion to the vehicle velocity V from 0 to the first velocity V1. The absolute value of the second target lean angle T2 is equal to or smaller than that of the first target lean angle T1. The reason is as follows. During lower velocity, the traveling direction is changed more frequently than during higher velocity. Therefore, during lower velocity, by making the absolute value of the lean angle T smaller, it is possible to drive more stably even if changing the traveling direction frequently. It should be noted that the relationship between the second target lean angle T2 and the vehicle velocity V may be any of a variety of other relationships such that the higher the vehicle velocity V is, the larger the absolute value of the second target lean angle T2 becomes.

In S180 after beginning to change the lean angle T (S170), the vehicle control unit 100 determines a first target wheel angle AFt1. The first target wheel angle AFt1 is determined based on the steering wheel angle and the vehicle velocity V. In this embodiment, a wheel angle AF determined based on the target lean angle identified in S170, and the above Equations 6, 7 is used as the first target wheel angle AFt1. Then, the vehicle control unit 100 supplies the steering motor control unit 103 with an instruction for controlling the steering motor 65 so that the wheel angle AF is equal to the first target wheel angle AFt1. According to the instruction, the steering motor control unit 103 drives the steering motor 65 so that the wheel angle AF is equal to the first target wheel angle AFt1. This causes the wheel angle AF of the vehicle 10 to be changed to the first target wheel angle AFt1.

It should be noted that during lower velocity (when the vehicle velocity V is lower than the first velocity V1), the wheel angle AF may be controlled so that it becomes a second target wheel angle AFt2 having an absolute value larger than that of the first target wheel angle AFt1. For example, in the case of the equal steering wheel angle, the second target wheel angle AFt2 may be determined so that the lower the vehicle velocity V, the larger the absolute value of the second target wheel angle AFt2. This configuration allows the minimum turning radius of the vehicle 10 to be reduced when the velocity V is lower. In any event, in the case of the equal vehicle velocity V, the second target wheel angle AFt2 is preferably determined so that the larger the absolute value of the steering wheel angle, the larger the absolute value of the second target wheel angle AFt2. In addition, when the vehicle velocity V changes between a vehicle velocity V lower than the first vehicle velocity V1 and a vehicle velocity V equal to or higher than the first velocity V1, the wheel angle AF and the lean angle T are preferably controlled so that the wheel angle AF and the lean angle T change smoothly.

It should be noted that the vehicle control unit 100 begins to turn the front wheel 12F (S180) after the beginning of change in the lean angle T (S170) and before the end of change in the lean angle T (S170). The vehicle control unit 100 may begin to turn the front wheel 12F (S180) after the end of change in the lean angle T (S170).

In response to completion of S170, S180, the process of FIG. 12 ends. The controller 110 repeatedly performs the process of FIG. 12. If the release condition is not met, the controller 110 continues to operate the steering device 41 in the second mode, control the lean angle T in S170, and control the wheel angle AF in S180. As a result, the vehicle 10 runs toward a traveling direction appropriate to the steering wheel angle.

The vehicle control unit 100 and the drive device control unit 101 serve as a drive control unit for controlling the electric motors 51L, 51R according to the accelerator operation amount and brake operation amount although not illustrated. In this embodiment, specifically, the vehicle control unit 100 supplies the drive device control unit 101 with an instruction for increasing output power of the electric motors 51L, 51R when the accelerator operation amount is increased. According to the instruction, the drive device control unit 101 controls the electric motors 51L, 51R so as to increase their output power. The vehicle control unit 100 supplies the drive device control unit 101 with an instruction for decreasing output power of the electric motors 51L, 51R when the accelerator operation amount is decreased. According to the instruction, the drive device control unit 101 controls the electric motors 51L, 51R so as to decrease their output power.

The vehicle control unit 100 supplies the drive device control unit 101 with an instruction for decreasing output power of the electric motors 51L, 51R when the brake operation amount becomes larger than 0. According to the instruction, the drive device control unit 101 controls the electric motors 51L, 51R so as to decrease their output power. It should be noted that the vehicle 10 preferably has a brake device which frictionally reduces rotational rate of at least one of all the wheels 12F, 12L, 12R. In addition, the brake device preferably reduces the rotational rate of the at least one wheel when the user steps on the brake pedal 46.

As described above, in this embodiment, when the release condition is met including that the vehicle velocity V is within the allowable velocity range from not less than the first velocity V1 to not more than the second velocity V2 (FIG. 12: S110: Yes), the vehicle control unit 100 operates the steering device 41 in the first mode in which the wheel angle AF is allowed to change following a lean of the vehicle body 90 (S120), and controls the rear wheel support 80 so that the vehicle body 90 is leaned according to the input to the steering wheel 41a (S130). And, the vehicle 10 is configured such that the natural frequency FQx of roll oscillation of the vehicle body 90 is smaller than the first frequency FQ1 or larger than the second frequency FQ2. Therefore, it is possible to suppress an increase in the roll oscillation of the vehicle body 90 due to a delayed phase of the wheel angle AF.

Where the natural frequency FQx of the vehicle body 90 may be larger than the second reference frequency FQ2. As described above, when the vehicle velocity V exceeds the second velocity V2 (FIG. 12: S110: No), the vehicle control unit 100 controls the wheel angle AF according to the input to the steering wheel 41a (S160, S180). Therefore, the oscillation of the wheel angle AF is suppressed, and thus it is possible to suppress an increase in the roll oscillation of the vehicle body 90 due to the oscillation of the wheel angle AF.

Alternatively, the first velocity V1 may be larger than zero, and the natural frequency FQx of the vehicle body 90 may be smaller than the first reference frequency FQ1. As described above, when the vehicle velocity V is lower than the first velocity V1 (FIG. 12: S110: No), the vehicle control unit 100 controls the wheel angle AF according to the input to the steering wheel 41a (S160). Therefore, the oscillation of the wheel angle AF is suppressed, and thus it is possible to suppress an increase in the roll oscillation of the vehicle body 90 due to the oscillation of the wheel angle AF.

Alternatively, the natural frequency FQx of the vehicle body 90 may be larger than the second reference frequency FQ2, and furthermore, the second velocity V2 may be the maximum velocity of the vehicle 10. In this case, it is possible to suppress an increase in the roll oscillation of the vehicle body 90 because it is avoided that the frequency at which the phase difference Dp (FIG. 10) is equal to −90 degrees is equal to the natural frequency FQx in a range of the vehicle velocity V of not more than the maximum velocity. In this case, the maximum velocity of the vehicle 10 may be the upper limit velocity Vth used in S120 of FIG. 12. According to this configuration, it is possible to suppress an increase in the roll oscillation of the vehicle body 90 in a range of the vehicle velocity V of not more than the upper limit velocity Vth which can be achieved by the electric motors 51R, 51L. It should be noted that the vehicle control unit 100 and the drive device control unit 101 as a whole are an example output limiting unit (sometimes referred to as output limiting unit 160) for lowering the outputs of the motors 51L, 51R which are drive devices when the vehicle velocity V exceeds the upper limit velocity Vth.

B. Second Embodiment

Figure 13:
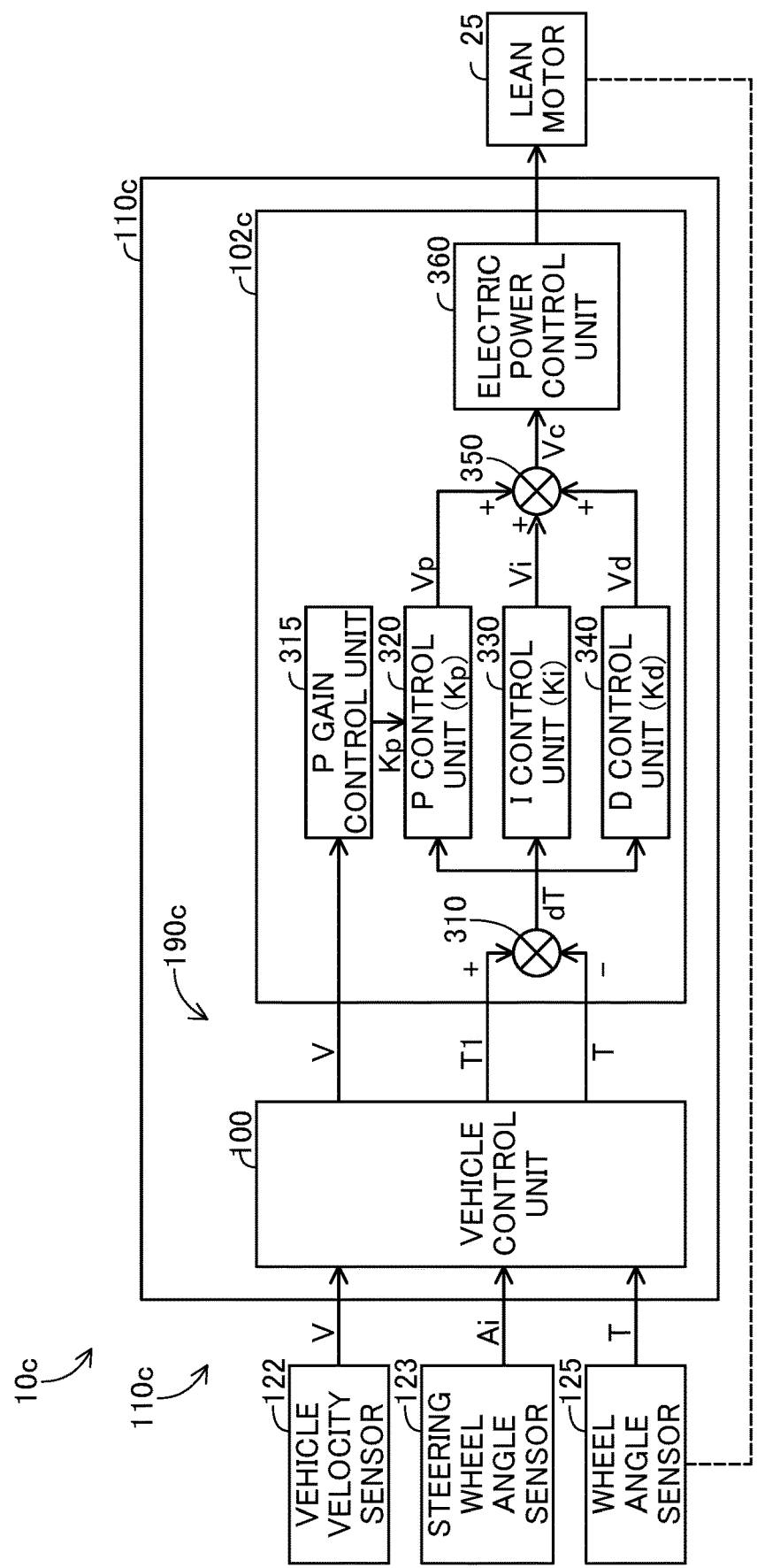
FIG. 13 is a block diagram showing a configuration relating to control of the vehicle 10c.

FIG. 13 is a block diagram showing the configuration relating to control of a vehicle 10c. In this embodiment, a controller 110c changes the natural frequency of roll oscillation of the vehicle body 90 according to the vehicle velocity V through control of the lean motor 25. FIG. 13 shows a portion of the controller 110c of the vehicle 10c which is related to the control of the lean motor 25. In this embodiment, in S130 of FIG. 12, the controller 110c performs a feedback control of the lean motor 25 which uses a difference dT between the first target lean angle T1 and the lean angle T so as to bring the lean angle T close to the first target lean angle T1. Specifically, a so-called PID (Proportional Integral Derivative) control is performed. When the absolute value of the difference dT is larger, this control causes the torque of the lean motor 25 to be increased, and thus the lean angle T to approach the first target lean angle T1. The natural frequency of roll oscillation of the vehicle body 90 is changed according to the vehicle velocity V by changing a P gain according to the vehicle velocity V although described in detail later. It should be noted that the configuration of the vehicle 10c in this embodiment is the same as the configuration of the corresponding parts of the vehicle 10 in the first embodiment, except that the P gain (and thus the natural frequency of the vehicle body 90) is changed according to the vehicle velocity V. For example, the parts other than the lean motor control unit 102c included in the controller 110c (FIG. 13) are configured in a similar manner to the corresponding parts of the controller 110 of FIG. 11. In addition, the controller 110c controls the vehicle 10c according to the process of FIG. 12.

As shown in FIG. 13, the lean motor control unit 102c includes a first summing point 310, a P gain control unit 315, a P control unit 320, a I control unit 330, a D control unit 340, a second summing point 350, and an electric power control unit 360. It should be noted that in this embodiment, the lean motor control unit 102c has a computer (not shown) similarly to the lean motor control unit 102 of FIG. 11. The computer of the lean motor control unit 102c includes a processor, a volatile memory, and a non-volatile memory. The non-volatile memory stores in advance a program for operating the lean motor control unit 102c. The processor performs a variety of processes by executing the program. The processing units 310, 315, 320, 330, 340, 350 are implemented by the processor of the lean motor control unit 102c. In addition, the electric power control unit 360 is implemented using an electric circuit (e.g. inverter circuit) which supplies the lean motor 25 with electric power from the battery 120. Hereinafter, a phrase "the processor performs a process as the processing units 310, 315, 320, 330, 340, 350, 360" may be expressed as a phrase "the processing units 310, 315, 320, 330, 340, 350, 360 perform a process."

Figure 14:
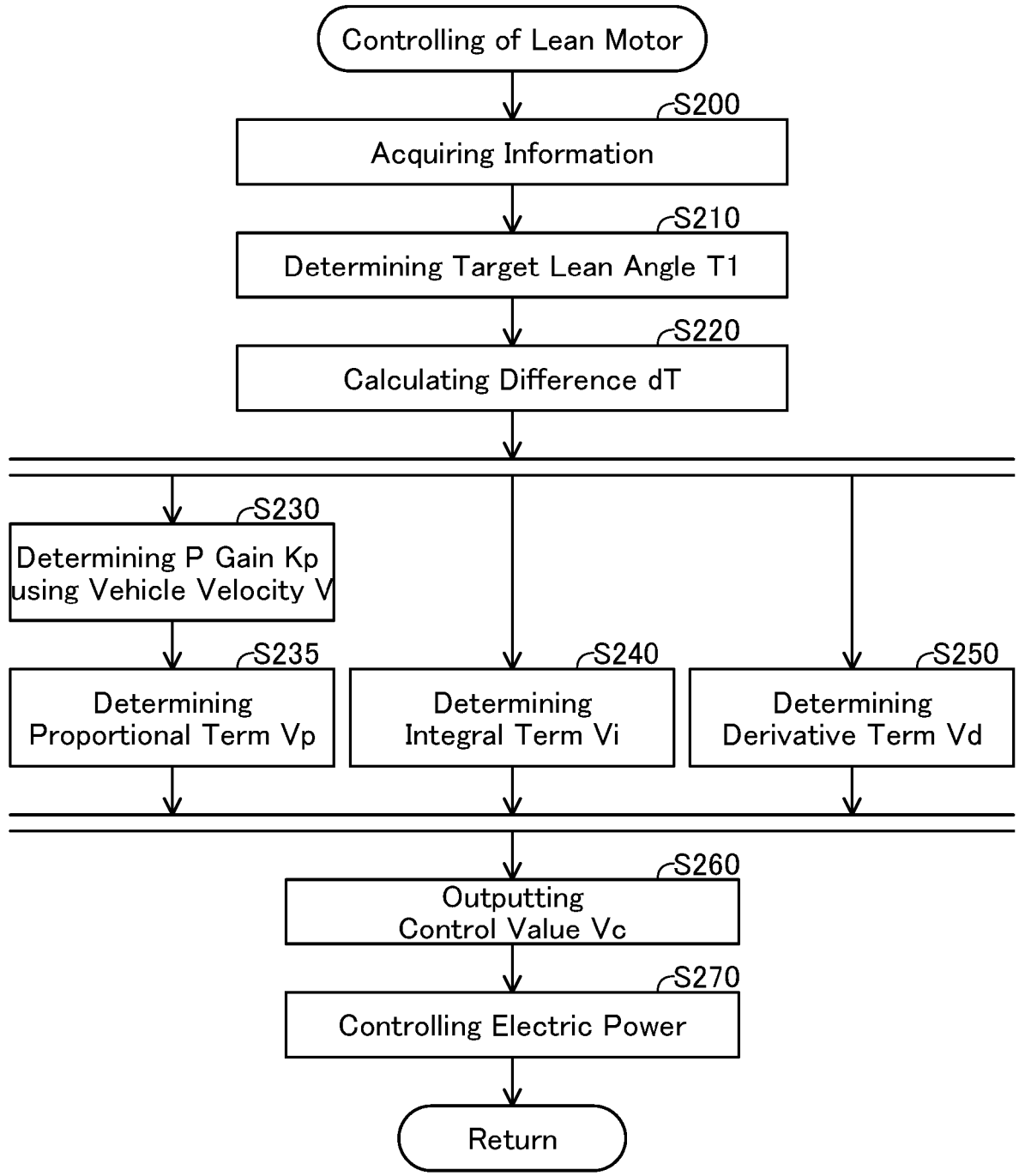
FIG. 14 is a flowchart showing an example process of controlling a lean motor 25.

FIG. 14 is a flowchart showing an example process of controlling the lean motor 25. This process represents an example process of S130 in FIG. 12. In S200, the vehicle control unit 100 acquires information indicative of the vehicle velocity V, information indicative of the steering wheel angle Ai, and information indicative of the lean angle T form the vehicle velocity sensor 122, the steering wheel angle sensor 123, and the lean angle sensor 125, respectively. In S210, the vehicle control unit 100 determines a first target lean angle T1. In this embodiment, the first target lean angle T1 is determined based on the steering wheel angle Ai in a similar manner to the first embodiment.

In S220, the first summing point 310 of the lean motor control unit 102c acquires the information indicative of the first target lean angle T1 and the information indicative of the lean angle T from the vehicle control unit 100. Then, the first summing point 310 outputs information indicative of a difference dT obtained by subtracting the lean angle T from the first target lean angle T1, to the P control unit 320, the I control unit 330, and the D control unit 340.

In S230, the P gain control unit 315 acquires the information indicative of the vehicle velocity V from the vehicle control unit 100, and then uses the vehicle velocity V to determine a P gain Kp. In this embodiment, a correspondence between the vehicle velocity V and the P gain Kp is predetermined (described in detail later). In S235, the P control unit 320 uses the difference dT and the P gain Kp to determine a proportional term Vp. The proportional term Vp may be determined by a well-known method for determining a proportional term of PID control. For example, a value obtained by multiplying the difference dT by the P gain Kp is output as the proportional term Vp.

In S240, the I control unit 330 uses the difference dT and the I gain Ki to determine an integral term Vi. In this embodiment, the I gain Ki is predetermined. The integral term Vi may be determined by a well-known method for determining an integral term of PID control. For example, a value obtained by multiplying an integrated value of the difference dT by the I gain Ki is output as the integrated term Vi. The time width for integration of the difference dT may be predetermined, and may be determined based on other parameter (e.g. I gain Ki).

In S250, the D control unit 340 uses the difference dT and the D gain Kd to determine a derivative term Vd. In this embodiment, the D gain Kd is predetermined. The derivative term Vd may be determined by a well-known method for determining a derivative term of PID control. For example, a value obtained by multiplying a derivative value of the difference dT by the D gain Kd is output as the derivative term Vd. The time difference for determining the derivative value of the difference dT may be predetermined, and may be determined based on other parameter (e.g. D gain Kd).

It should be noted that the process for determining the proportional term Vp at S230, S235, the process for determining the integral term Vi at S240, and the process for determining the derivative term Vd at S250 are performed in parallel.

In S260, the second summing point 350 acquires information indicative of terms Vp, Vi, Vd from the control units 320, 330, 340, respectively. Then, the second summing point 350 determines a control value Vc which is a sum of these terms Vp, Vi, Vd, and then outputs information indicative of the control value Vc to the electric power control unit 360. In S270, the electric power control unit 360 controls the electric power to be supplied to the lean motor 25 according to the control value Vc. The larger the absolute value of the control value Vc is, the larger the amount of electric power is. In addition, the direction of the torque of the lean motor 25 caused due to the control value Vc is a direction that allows the lean angle T to approach the first target lean angle T1.

The controller 110c repeatedly performs S130 of FIG. 12, i.e. the process of FIG. 14. By doing so, the electric power to be supplied to the lean motor 25 is controlled so that the lean angle T approaches the first target lean angle T1.

Figure 15:
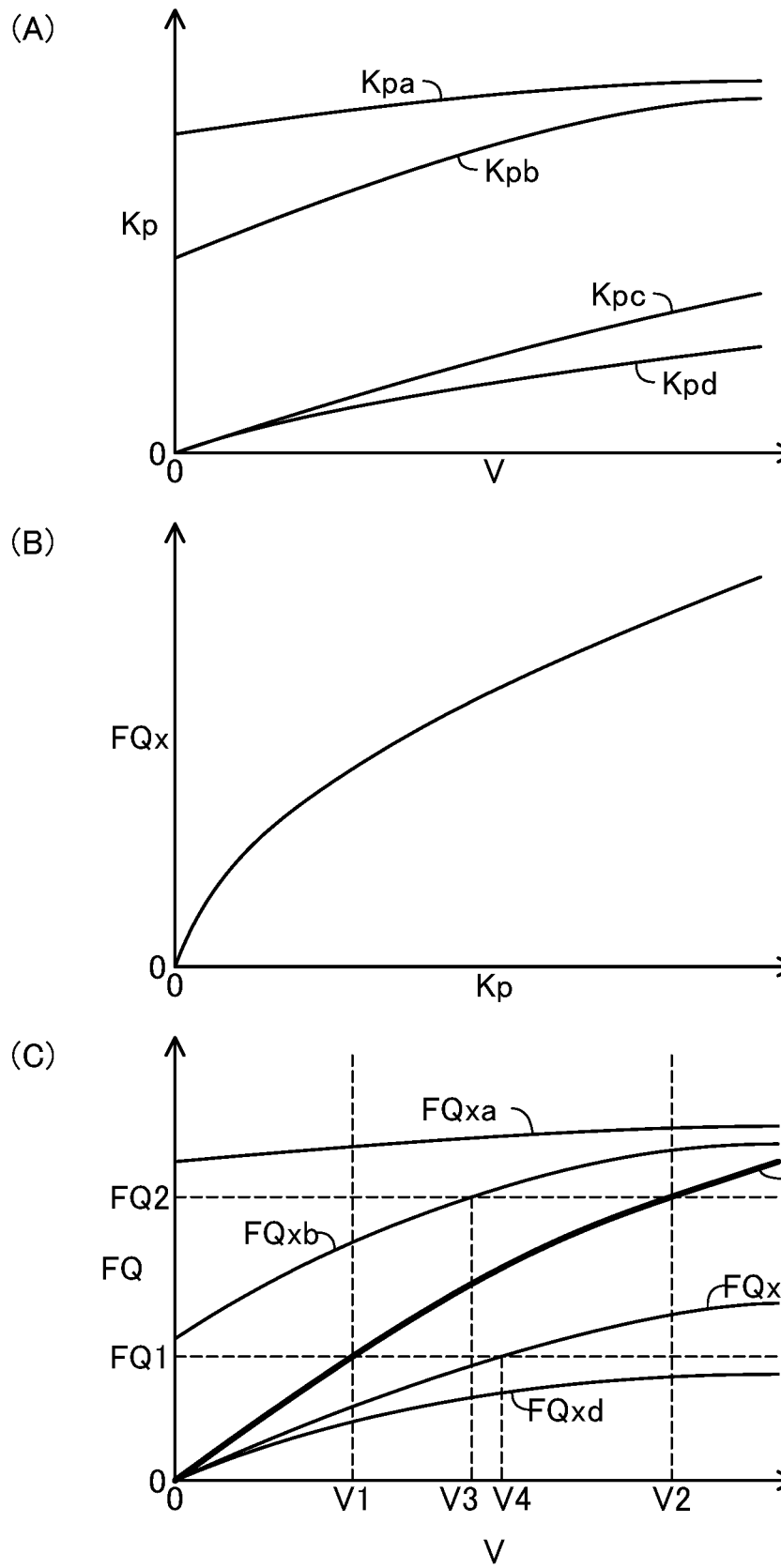
FIGS. 15(A)-15(C) are a graph showing correspondences between the vehicle velocity V and the P gain Kp, a graph showing a correspondence between the P gain Kp and the natural frequency FQx, and a graph showing correspondences between the vehicle velocity V and the frequency FQ.

FIG. 15(A) is a graph showing correspondences between the vehicle velocity V and the P gain Kp. The horizontal axis represents the vehicle velocity V, and the vertical axis represents the P gain Kp. This figure shows four P gains Kpa–Kpd available for this embodiment.

All of the P gains Kpa–Kpd are increased with an increase in the vehicle velocity V. In addition, a magnitude relationship among the four P gains Kpa–Kpd is Kpa>Kpb>Kpc>Kpd in the case of the equal vehicle velocity V. However, the relatively smaller two P gains Kpc, Kpd are equal to zero when the vehicle velocity V is equal to zero. On the other hand, the relatively larger two P gains Kpa, Kpb are larger than zero over the entire range of the vehicle velocity V.

FIG. 15(B) is a graph showing a correspondence between the P gain Kp and the natural frequency FQx of the vehicle body 90. As described above, in this embodiment, the lean motor 25 is controlled by the so-called PID control which uses the lean angle T and the first target lean angle T1. In the PID control, the larger the P gain Kp is, the larger the absolute value of the proportional term Vp (and thus the absolute value of the control value Vc). Therefore, in the case of the equal absolute value of the difference dT, the larger the P gain Kp is, the larger the magnitude of torque of the lean motor 25 is. That is, the roll of the vehicle body 90 is more suppressed with the larger P gain Kp. As a result, the larger the P gain Kp is, the larger the natural frequency FQx becomes.

FIG. 15(C) is a graph showing correspondences between the vehicle velocity V and the frequency FQ of the roll angle Tr of the vehicle body 90. The horizontal axis represents the vehicle velocity V, and the vertical axis represents the frequency FQ. A frequency FQ90 in the figure represents a frequency FQ at which the phase difference Dp (FIG. 10) is equal to −90 degrees (sometimes referred to as reference frequency FQ90). As described with regard to FIG. 10, the reference frequency FQ90 is increased with an increase in the vehicle velocity V.

In FIG. 15(C), four natural frequencies FQxa-FQxd are shown. These four natural frequencies FQxa-FQxd correspond to the four P gains Kpa-Kpd of FIG. 15(A), respectively. That is, correspondences between the four natural frequencies FQxa-FQxd and the vehicle velocity V are derived respectively from the correspondences between the four P gains Kpa-Kpd and the vehicle velocity V of FIG. 15(A), and the correspondence of FIG. 15(B).

As shown in FIG. 15(A), all of the P gains Kpa-Kpd are increased with an increase in the vehicle velocity V. Therefore, all of the natural frequencies FQxa-FQxd are increased with an increase in the vehicle velocity V. Furthermore, a magnitude relationship among the four natural frequencies FQxa-FQxd is FQxa>FQxb>FQxc>FQxd in the case of the same vehicle velocity V. However, the relatively smaller two natural frequencies FQxc, FQxd are equal to zero when the vehicle velocity V is equal to zero.

The relatively larger natural frequencies FQxa, FQxb are larger than the reference frequency FQ90 over the entire range of the vehicle velocity V. In particular, the largest first natural frequency FQxa is larger than the second reference frequency FQ2 over the entire range of the vehicle velocity V from not less than the first velocity V1 to not more than the second velocity V2.

The relatively smaller natural frequencies FQxc, FQxd are smaller than the reference frequency FQ90 over the entire range of the vehicle velocity V (except for V=0). In particular, the smallest fourth natural frequency FQxd is smaller than the first reference frequency FQ1 over the entire range of the vehicle velocity V from not less than the first velocity V1 to not more than the second velocity V2.

When the lean motor 25 is controlled according to the P gains Kpa-Kpd of FIG. 15(A), the frequency FQ90 corresponding to the phase difference Dp of −90 degrees is different from the natural frequencies FQxa-FQxd as shown in FIG. 15(C). Therefore, an increase is suppressed in the oscillation amplitude of the vehicle body 90 even if the phase difference Dp becomes equal to −90 degrees in a situation where the steering device 41 operates in the first mode M1 in which the wheel angle AF changes following a lean of the vehicle body 90.

In addition, the first natural frequency FQxa is larger than the second reference frequency FQ2 over the entire range of the vehicle velocity V from not less than the first velocity V1 to not more than the second velocity V2, as shown in FIG. 15(C). Therefore, an increase is suppressed in the oscillation amplitude of the vehicle body 90 as in the case where the natural frequency FQx is larger than the second frequency FQ2 in the embodiment of FIG. 10.

In addition, the fourth natural frequency FQxd is smaller than the first reference frequency FQ1 over the entire range of the vehicle velocity V from not less than the first velocity V1 to not more than the second velocity V2, as shown in FIG. 15(C). Therefore, an increase is suppressed in the oscillation amplitude of the vehicle body 90 as in the case where the natural frequency FQx is smaller than the first reference frequency FQ1 in the embodiment of FIG. 10.

In addition, generally, the smaller the magnitude of the torque of the lean motor 25 is, the better the ride quality of the vehicle 10c is. And, the smaller the P gain Kp is, the smaller the magnitude of the torque of the lean motor 25. All of the P gains Kpa-Kpd of FIG. 15(A) are decreased with a decrease in the vehicle velocity V. Therefore, all of the P gains Kpa-Kpd allow the ride quality of the vehicle 10c to be improved in the case of the vehicle velocity V being lower. Furthermore, a relatively smaller P gain among the four P gains Kpa-Kpd allows the ride quality of the vehicle 10c to be improved better than a relatively larger P gain.

In addition, within the range of the vehicle velocity V from not less than the first velocity V1 to not more than the second velocity V2, the second natural frequency FQxb is smaller than the second reference frequency FQ2 over a portion of the range in which the vehicle velocity V is lower than the third velocity V3, as shown in FIG. 15(C) (where V1<V3<V2). The second P gain Kpb (FIG. 15(A)) which achieves such a second natural frequency FQxb improves the ride quality of the vehicle 10c during lower velocity better than the first P gain Kpa which achieves the first natural frequency FQxa larger than the second reference frequency FQ2 independently of the vehicle velocity V.

Furthermore, within the range of the vehicle velocity V from not less than the first velocity V1 to not more than the second velocity V2, the third natural frequency FQxc is larger than the first reference frequency FQ1 over a portion of the range within which the vehicle velocity V is higher than the fourth velocity V4, as shown in FIG. 15(C) (where V1<V4<V2). The third P gain Kpc (FIG. 15(A)) which achieves such a third natural frequency FQxc suppresses the oscillation of the vehicle 10c during higher velocity better than the fourth P gain Kpd which achieves the fourth natural frequency FQxd smaller than the first reference frequency FQ1 independently of the vehicle velocity V.

It should be noted that in general, the natural frequency is preferably different from the reference frequency FQ90 over a range of the vehicle velocity V (in this case, the range of from not less than the first velocity V1 to not more than the second velocity V2) within which the steering device 41 operates in the first mode M1. That is, it is preferable to control the P gain Kp so that the natural frequency is either within a range of smaller than the reference frequency FQ90 or within a range of larger than the reference frequency FQ90 when the vehicle velocity V is within the range of from not less than the first velocity V1 to not more than the second velocity V2. This suppresses an increase in the oscillation amplitude of the vehicle body 90.

It should be noted that in S170 of FIG. 12, the controller 110c may perform the process of FIG. 14 as in S130. In this case, the second target lean angle T2 may be used instead of the first target lean angle T1 in a similar manner to the first embodiment described above.

In addition, the information indicative of the correspondence between the P gain Kp and the vehicle velocity V is stored in advance in a non-volatile memory (not shown) of the lean motor control unit 102c. The P gain control unit 315 of the lean motor control unit 102c references to this information to identify the P gain Kp corresponding to the vehicle velocity V according to the predetermined correspondence in the referenced information. It should be noted that the P gain control unit 315 is an example changing unit which changes the natural frequency of roll oscillation of the vehicle body 90 according to the vehicle velocity V. In addition, the vehicle control unit 100 and the lean motor control unit 102c as a whole are an example lean control unit (sometimes referred to as lean control unit 190c) which controls the lean mechanism 200 in response to an input into an operation input unit (e.g. steering wheel 41a).

It should be noted that in the embodiment of FIG. 13, at lease one of the I control unit 330 and the D control unit 340 may be omitted. That is, in the process of FIG. 14, at least one of S240 and S250 may be omitted.

C. Third Embodiment

Figure 16:
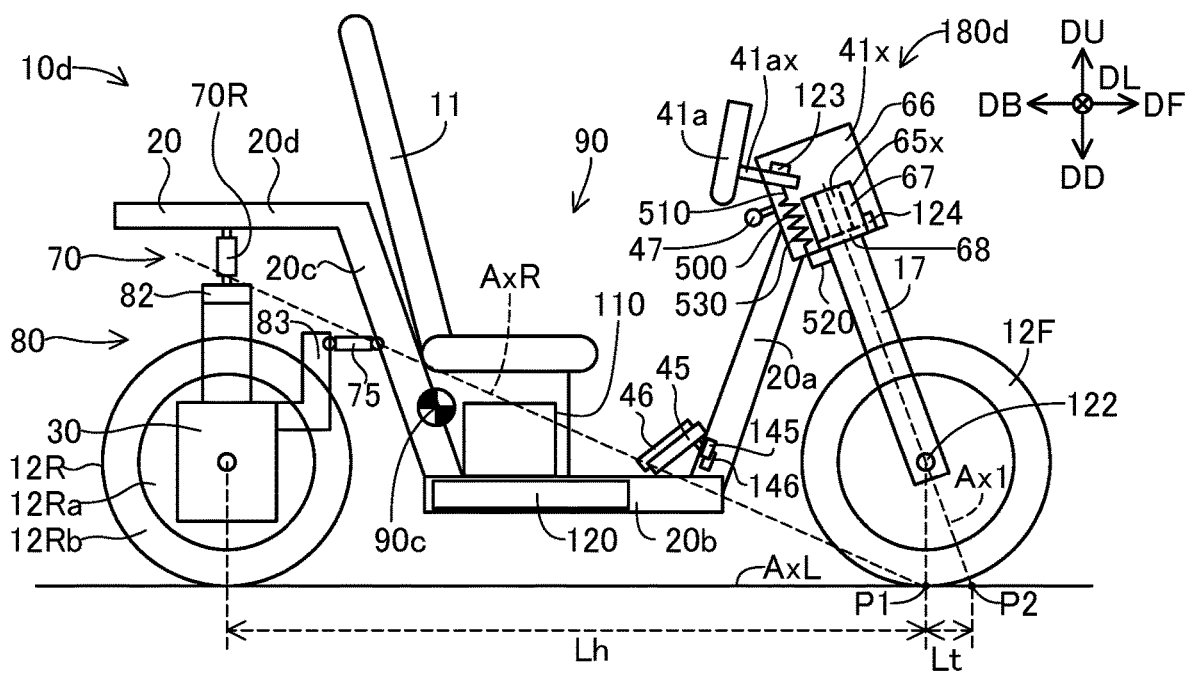
FIG. 16 is an explanatory diagram showing another embodiment of vehicle.

FIG. 16 is an explanatory diagram showing another embodiment of vehicle. This figure shows a right side view of the vehicle 10d similarly to FIG. 1. The vehicle 10d differs from the vehicle 10 of FIG. 10 in that a connecting unit 500 which connects the supporting rod 41ax to the front fork 17 is added to the vehicle 10d. FIG. 16 also shows a more specific configuration of the steering motor 65x of the steering device 41x. The configurations of the other parts of the vehicle 10d are the same as those of the corresponding parts of the vehicle 10 in the first embodiment (the same components are labeled by the same reference numbers, and are not specifically described here).

The connecting unit 500 includes a first portion 510 secured to the supporting rod 41ax, a second portion 520 secured to the front fork 17, and a third portion 530 which connects the first portion 510 and the second portion 520. The supporting rod 41ax is secured to the steering wheel 41a. The front fork 17 is an example supporting member which rotatably supports the front wheel 12F. The connecting unit 500 is connected indirectly to the steering wheel 41a via the supporting rod 41ax, and is connected directly to the front fork 17. The third portion 530 in this embodiment is an elastic body, and is specifically a coil spring. When a user rotates the steering wheel 41a to right or left, a rightward or leftward force applied by the user to the steering wheel 41a is transmitted via the connecting unit 500 to the front fork 17. That is, the user can apply a rightward or leftward force to the front fork 41 and thus the front wheel 12F by handling the steering wheel 41a. This allows the user to adjust the orientation (i.e. wheel angle AF) of the front wheel 12F by handling the steering wheel 41a when the front wheel 12F does not face to an intended direction (that is, the wheel angle AF is different from an intended angle). This can result in improved driving stability. For example, when the wheel angle AF changes in response to external factors such as irregularities of road surface or wind, the user can adjust the wheel angle AF by handling the steering wheel 41a.

It should be noted that the connecting unit 500 connects loosely the supporting rod 41ax and the front fork 17. For example, the spring constant of the third portion 530 of the connecting unit 500 is set to a sufficiently small value. Such a connecting unit 500 allows the front wheel 12F to turn to right or left relative to the vehicle body 90 following a change in lean of the vehicle body 90 independently of the steering wheel angle input to the steering wheel 41a when the steering device 41x operates in the first mode. Therefore, the driving stability is improved because the wheel angle AF can change to an angle appropriate for the lean angle T. It should be noted that the vehicle 10 can operate as follows when the connecting unit 500 achieves the loose connection, that is, the front wheel 12F is allowed to turn as described above. For example, even if the steering wheel 41a is rotated to left, the front wheel 12F can turn to right when the vehicle body 90 leans to right. In addition, no one-to-one correspondence between the steering wheel angle and the wheel angle AF is maintained when the steering wheel 41a is rotated to right and left while the vehicle 10 stops on a flat and dry asphalt road. A force applied to the steering wheel 41a is transmitted via the connecting unit 500 to the front fork 17, and thus the wheel angle AF can change according to a change in the steering wheel angle. However, when the orientation of the steering wheel 41a is adjusted so that the steering wheel angle takes a single specific value, the wheel angle AF can change without being fixed at a single value. For example, the steering wheel 41a is rotated to right while both the steering wheel 41a and the front wheel 12F face to the straight movement direction. This causes the front wheel 12F to face to the right. Thereafter, the steering wheel 41a is brought back again to the straight movement direction. At this time, the front wheel 12F does not face to the straight movement direction, but can be maintained so that it faces to the right. In addition, the vehicle 10 sometimes cannot turn to the direction of the steering wheel 41a even if the steering wheel 41a is rotated to right or left. Furthermore, when the vehicle 10 is stopped, a ratio of change amount in wheel angle AF to that in steering wheel angle can be smaller as compared to the case where the vehicle 10 is running.

It should be noted that the first portion 510 of the connecting unit 500 may be secured directly to the steering wheel 41a. That is, the connecting unit 500 may be secured directly to the steering wheel 41a. In addition, the second portion 520 of the connecting unit 500 may be connected via another member to the front fork 17. That is, the connecting unit 500 may be connected via another member indirectly to the front fork 17. The third portion 530 of the connecting unit 500 may be another type of member which can be elastically deformed. The third portion 530 may be made of a variety of elastic body, e.g. torsion spring, rubber, etc. Alternatively, the third portion 530 may be another type of device rather than an elastic body. For example, the third portion 530 may be a damper. Alternatively, the third portion 530 may be a device such as fluid clutch or fluid torque converter which transmits a torque via fluid. In this manner, the third portion 530 of the connecting unit 500 may include at least one of elastic body, damper, fluid clutch, and fluid torque converter.

The third portion 530 may include a variety of devices which is connected to the first portion 510 and the second portion 520, transmits a torque from the first portion 510 to the second portion 520, and includes a movable part that allows for a change in relative position between the first portion 510 and the second portion 520. Such a third portion 530 allows the second portion 520 to move while the first portion 510 does not move, that is, allows the wheel angle AF to change while the steering wheel angle Ai does not change. As a result, the wheel angle AF of the front wheel 12F can change readily following a lean of the vehicle body 90.

In any event, the connecting unit 500 preferably achieves a connection loose enough to allow the wheel angle AF of the front wheel 12F to change following a change in lean of the vehicle body 90 independently of the steering wheel angle input to the steering wheel 41a when the steering device 41x operates in the first mode. In addition, such a connecting unit 500 may be also provided for the vehicle of another embodiment (e.g. the vehicle 10c of FIG. 13).

Figure 17:
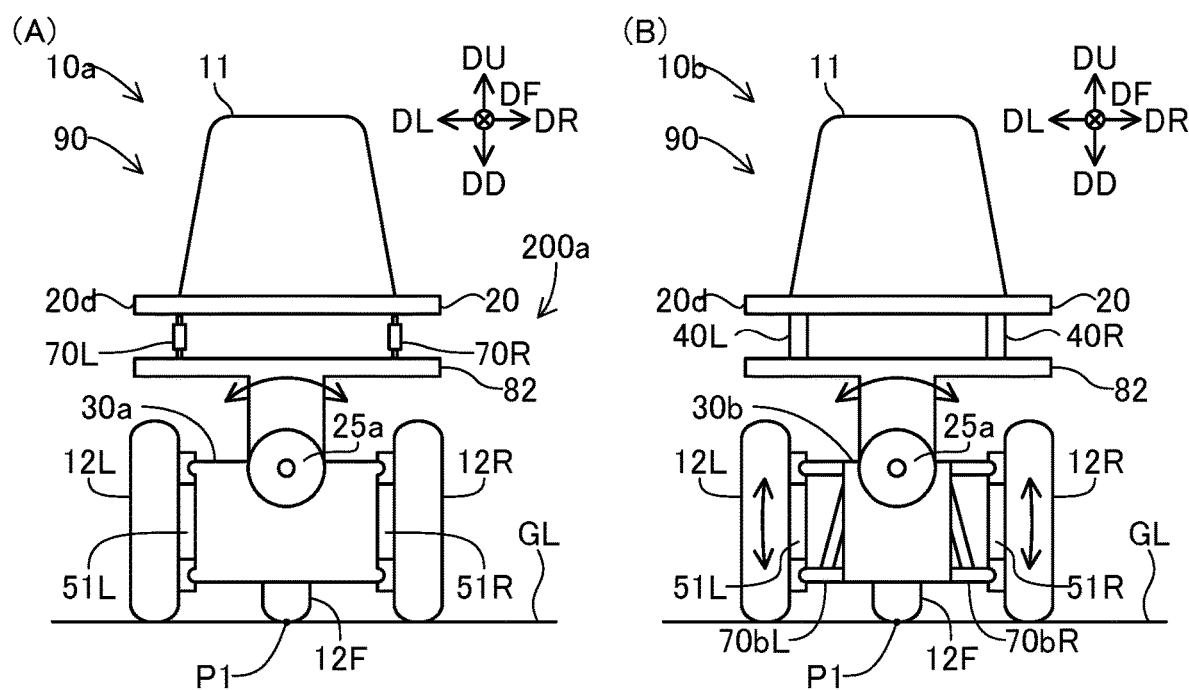
FIGS. 17(A) and 17(B) are schematic diagrams showing other embodiments of vehicles.

D. Modifications (1) As a configuration of lean mechanism which leans the vehicle body 90 in its width direction, a variety of other configurations may be employed instead of the configuration including the link mechanism 30 (FIG. 4). FIG. 17(A) is a schematic diagram showing another embodiment of vehicle. The vehicle 10a of FIG. 17(A) is obtained by substituting the link mechanism 30 of the vehicle 10 illustrated in FIG. 4 etc. with a motor pedestal 30a. Each of the motors 51L, 51R of the rear wheel 12L, 12R is secured to the motor pedestal 30a. In addition, the lean motor 25a can rotate the first support portion 82 to each of the right direction DR and the left direction DL relative to the motor pedestal 30a. This enables the vehicle body 90 to lean to each of the right direction DR and the left direction DL. The rear wheel 12L, 12R stand upright relative to the ground GL without being tilted, whether or not the vehicle body 90 leans. In this manner, as a lean mechanism 200a, a configuration may be employed that includes the pedestal 30a to which the motors 51L, 51R of the wheels 12L, 12R are secured, the member 82 which supports the vehicle body 90, and the lean motor 25a which tilts the member 82 relative to the pedestal 30a. In addition, the drive device of the lean mechanism may be another type of drive device instead of the electric motor. For example, the lean mechanism may be driven by fluid pressure (e.g. oil pressure) from a pump. For example, each of the pair of wheels 12L, 12R (FIG. 5(B)) may be attached to the member 82 supporting the vehicle body 90 so that it can slide vertically, and the relative position of the pair of wheels 12L, 12R in a direction perpendicular to the rotational axis may be changed by a first hydraulic cylinder coupling the member 82 to the wheel 12L and a second hydraulic cylinder coupling the member 82 to the wheel 12R. In addition, the member 82 supporting the vehicle body 90 (FIG. 17(A)) may be attached to the pedestal 30a so that it can rotate to right and left, and the orientation of the member 82 relative to the pedestal 30a may be changed by a hydraulic cylinder coupling the pedestal 30a to the member 82. In general, it is possible to employ a variety of configurations which can tilt the vehicle body 90 relative to the ground GL. It is preferable to employ a mechanism which can maintain the lean angle T of the vehicle body 90 at a target lean angle, in contrast to a simple suspension.

In addition, the lean mechanism may include a "first member which is connected directly or indirectly to at least one of the pair of wheels spaced apart from each other in the width direction of the vehicle," a "second member connected directly or indirectly to the vehicle body," and a "bearing coupling the first and second members," for example. In this case, the bearing couples the second member to the first member so that the second member 2 can rotate relative to the first member in the width direction of the vehicle. In this manner, the bearing rotatably couples the second member to the first member. It should be noted that the bearing may be a ball bearing, or may be a sliding bearing instead. In addition, the lean mechanism may include a drive device which applies to the first and second members a torque changing the orientation of the second member relative to the first member.

Figure 18:
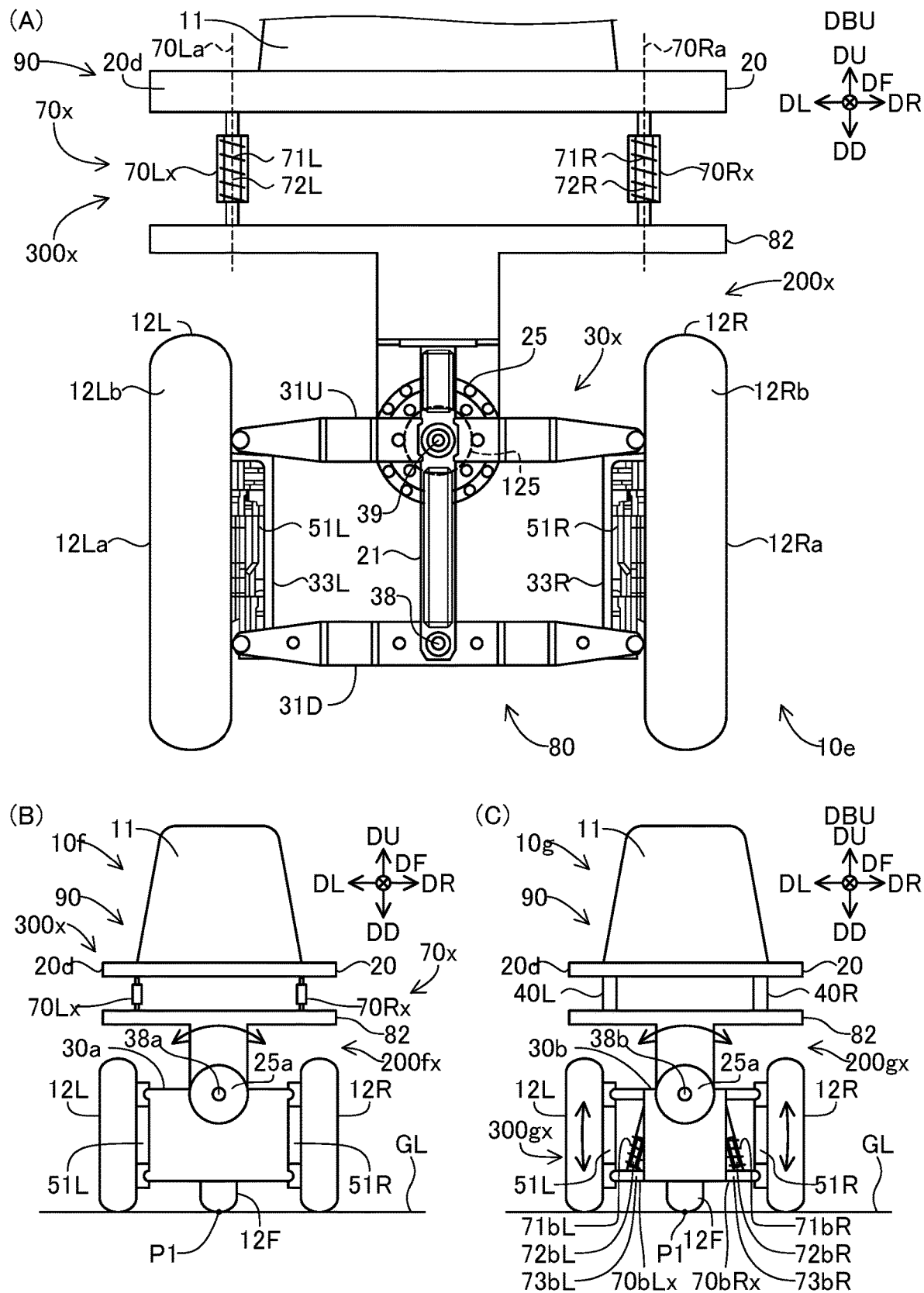
FIG. 18(A)-18(C) are explanatory diagrams showing embodiments of vehicles.

FIGS. 18(A), 18(B) are explanatory diagrams showing embodiments of vehicle with a lean mechanism. The vehicles 10e, 10f of FIGS. 18(A), 18(B) are more specific embodiments of the vehicles 10, 10a of FIGS. 4, 17(A), respectively. The configurations of parts other than specific configurations described later of the vehicles 10e, 10f of FIGS. 18(A), 18(B) are the same as those of the corresponding parts of the vehicles 10, 10a FIGS. 4, 17(A) (the same components are labeled by the same reference numbers, and are not specifically described here).

A link mechanism 30x of FIG. 18(A) includes a bearing 38 which couples the lower lateral link member 31D to the center longitudinal link member 21, and a bearing 39 which couples the upper lateral link member 31U to the center longitudinal member 21. The lateral link members 31D, 31U are connected via the link members 33L, 33R and the motors 51L, 51R indirectly to the wheels 12L, 12R, and are an example of the first member. The center longitudinal member 21 is connected via the first support portion 82 and the suspension system 70x (described in detail later) indirectly to the vehicle body 90, and is an example of the second member. The bearings 38, 39 rotate the center longitudinal member 21 corresponding to the second member relative to the link members 31D, 31U corresponding to the first member, in the width direction of the vehicle 10e. A lean mechanism 200x of FIG. 18(A) includes the lateral link members 31D, 31U, the center longitudinal member 21, the bearings 38, 39 which rotatably couple the lateral link members 31D, 31U to the center longitudinal member 21, and the lean motor 25 as a drive device.

The vehicle 10f of FIG. 18(B) includes a bearing 38a which couples the motor pedestal 30a to the first support portion 82. The motor pedestal 30a is connected via the motors 51L, 51R indirectly to the wheels 12L, 12R, and is an example of the first member. The first support portion 82 is connected via the suspension system 70x indirectly to the vehicle body 90, and is an example of the second member. The bearing 38a rotates the first support portion 82 corresponding to the second member relative to the motor pedestal 30a corresponding to the first member, in the width direction of the vehicle 10f, 10g. A lean mechanism 200fx of FIG. 18(B) includes the motor pedestal 30a, the first support portion 82, the bearing 38a which rotatably couples the motor pedestal 30a to the first support portion 82, and the lean motor 25a as a drive device.

In addition, the lean control unit which controls the lean mechanism in response to an input into an operation input unit (e.g. steering wheel 41a) may be an electric circuit including a computer as the vehicle control unit 100 and the lean motor control units 102, 102c described above with regard to FIG. 11, FIG. 13. Instead, an electric circuit including no computer may control the lean mechanism in response to an input into the operation input unit so that the lean angle T becomes a target lean angle. In this manner, the lean control unit may include an electric circuit which controls the lean mechanism (e.g. an electric circuit which controls the drive device of the lean mechanism).

(2) In addition to the lean mechanism, a variety of configurations may be employed as a configuration for rolling the vehicle body 90 in its width direction. FIG. 17(B) is a schematic diagram showing another embodiment of vehicle. In a vehicle 10b of FIG. 17(B), in contrast to the vehicle 10a of FIG. 17(A), the rear wheels 12L, 12R are connected to a motor pedestal 30b via suspensions 70bL, 70bR, respectively. A variety of suspensions, e.g. strut-type suspension or double wishbone-type suspension, may be employed as the suspensions 70bL, 70bR. In addition, the support portion 20d of the main body 20 is secured to the first support portion 82 via spacers 40L, 40R instead of the suspensions 70L, 70R. The configurations of the other parts of the vehicle 10b are the same as those of the corresponding parts of the vehicle 10a of FIG. 17(A).

In the embodiment of FIG. 17(B), the main body 20 (and thus the vehicle body 90) does not rotate relative to the first support portion 82 because the main body 20 is secured to the first support portion 82. On the other hand, the suspensions 70bL, 70bR can allow the rear wheels 12L, 12R to move independently of each other to the upward direction DU or to the downward direction DD relative to the motor pedestal 30b. This allows the vehicle body 90 to roll in its width direction (not shown). In addition to the lean mechanism, the suspensions connected to the wheels 12L, 12R may be employed as a configuration for rolling the vehicle body 90 in its width direction.

Alternatively, as a configuration for rolling the vehicle body 90 in its width direction, any configuration which allows the vehicle body 90 to roll in its width direction may be employed instead of the suspensions. For example, even if the suspensions for rolling the vehicle body 90 are omitted, the tires 12Lb, 12Rb of the rear wheels 12L, 12R are elastically deformed so as to allow the vehicle body 90 to roll in its width direction. In addition, the members (e.g.

main body 20) which constitute the vehicle body 90 are typically not a completely rigid body but is deformable (e.g. the main body 20 can be subject to torsion). Therefore, the vehicle body 90 can roll in its width direction by deforming by itself. In general, in addition to the lean mechanism, as a configuration for rolling the vehicle body 90 in its width direction, a configuration may be employed that allows the vehicle body 90 to roll in its width direction without maintaining a lean of the vehicle body 90 relative to the ground GL.

In this manner, the vehicle may include a roll device for rolling the vehicle body in its width direction in addition to the lean mechanism. The roll device may include a "wheel side member which is a member connected directly or indirectly to at least one of the pair of wheels spaced apart from each other in the width direction of the vehicle," a "vehicle body side member which is a member connected directly or indirectly to the vehicle body," and a "suspension coupling the wheel side member and the vehicle body side member," for example. The suspension can change the position of the wheel side member relative to the vehicle body side member (including, for example, the position in the vehicle body upward direction DBU (FIG. 5(A), FIG. 5(B)). In this case, the suspension may include an elastic body and a shock absorber. The elastic body generates a force which reduces a misalignment of the position of the wheel side member relative to the vehicle body side member from a predetermined position. The elastic body may be a spring, e.g. a coil spring, a flat spring, and a torsion spring, or may be another type of elastic body such as rubber or resin. The shock absorber is also referred to as damper, and damps an oscillation of the position of the wheel side member relative to the vehicle body side member.

Each of the vehicles 10*e*, 10*f*, 10*g* of FIG. 18(A), FIG. 18(B), FIG. 18(C) is an embodiment of vehicle with a roll device. The suspensions 70L, 70R of the suspension system 70*x* of FIG. 18(A) corresponds to the suspensions 70L, 70R of the suspension system 70 of FIG. 4, respectively. The suspensions 70Lx, 70Rx couple the first support portion 82 and the support portion 20*d*. The first support portion 82 is connected via the motors 51L, 51R and the link mechanism 30 indirectly to the wheels 12L, 12R, and is an example of the wheel side member. The support portion 20*d* is part of the vehicle body 90, and can be considered to be connected directly to the vehicle body 90. Such a support portion 20*d* is an example of the vehicle body side member. Each suspension 70Lx, 70Rx can extend or retract along a central axis 70La, 70Ra. This allows the position (e.g. the position in a direction parallel to the vehicle body upward direction DBU) of the first support portion 82 (and thus the wheels 12L, 12R) relative to the support portion 20*d* to change. The left suspension 70Lx includes a coil spring 71L and a shock absorber 72L, and the right suspension 70Rx includes a coil spring 71R and a shock absorber 72R. Such suspensions 70L, 70R allows the vehicle body 90 to roll in its width direction as also described above with regard to FIG. 5(A), FIG. 5(B). The roll device 300*x* of FIG. 18(A) includes the first support portion 82, the support portion 20*d*, and the suspension system 70*x* (in this example, the two suspensions 70Lx, 70Rx) which couples the first support portion 82 and the support portion 20.

The vehicle 10*f* of FIG. 18(B) includes the same roll device 300*x* as the roll device 300*x* of FIG. 18(A). This roll device 300*x* can roll the vehicle body 90 in its width direction.

The vehicle 10*g* of FIG. 18(C) is a more specific embodiment of the vehicle 10*b* of FIG. 17(B). The configurations of parts other than specific configurations described later of the vehicle 10*g* of FIG. 18(C) are the same as those of the corresponding parts of the vehicle 10*b* FIG. 17(B) (the same components are labeled by the same reference numbers, and are not specifically described here).

The suspensions 70*b*Lx, 70*b*Rx of the vehicle 10*g* of FIG. 18(C) correspond to the suspensions 70*b*L, 70*b*R of FIG. 17(B), respectively. The suspension 70*b*Lx on the left side couples the motor pedestal 30*b* and the left electric motor 51L. Specifically, the suspension 70*b*Lx on the left side includes an arm 73*b*L which couples the motor pedestal 30*b* and the left electric motor 51L, a coil spring 71*b*L, and a shock absorber 72*b*L. Each of the coil spring 71*b*L and the shock absorber 72*b*L couples the arm 73*b*L and the motor pedestal 30*b*. Similarly, the suspension 70*b*Rx on the right side includes an arm 73*b*R which couples the motor pedestal 30*b* and the right electric motor 51R, a coil spring 71*b*R, and a shock absorber 72*b*R. Each of the coil spring 71*b*R and the shock absorber 72*b*R couples the arm 73*b*R and the motor pedestal 30*b*.

In addition, this vehicle 10*g* includes a bearing 38*b* which couples the motor pedestal 30*b* to the first support portion 82. The motor pedestal 30*b* is connected via the bearing 38*b*, the first support portion 82, and the spacers 40L, 40R indirectly to the vehicle body 90, and corresponds to the vehicle body side member. The motors 51L, 51R are connected directly to the wheels 12L, 12R, and correspond to the wheel side member. Each of the arms 73*b*L, 73*b*R can rotate up and down around its portion connected to the motor pedestal 30*b*. Thereby, the suspensions 70*b*Lx, 70*b*Rx can allow the rear wheels 12L, 12R to move independently of each other to the upward direction DU or to the downward direction DD relative to the motor pedestal 30*b*. This allows the vehicle body 90 to roll in its width direction. The roll device 300*gx* of FIG. 18(C) includes the motors 51L, 51R, the motor pedestal 30*b*, and the suspensions 70*b*Lx, 70*b*Rx which couple the motors 51L, 51R and the motor pedestal 30*b*.

It should be noted that the vehicle 10*g* of FIG. 18(C) includes a lean mechanism 200*gx* similar to the lean mechanism 200*fx* of FIG. 18(B). The motor pedestal 30*b* is connected via the suspensions 70*b*Lx, 70*b*Rx and the motors 51L, 51R indirectly to the wheels 12L, 12R, and is an example of the first member. The first support portion 82 is connected via the spacers 40L, 40R indirectly to the support portion 20*d* (and thus the vehicle body 90), and is an example of the second member. The bearing 38*b* rotates the first support portion 82 relative to the motor pedestal 30*b*, in the width direction of the vehicle 10*g*. The lean mechanism 200*gx* includes the motor pedestal 30*b*, the first support portion 82, the bearing 38*b* which rotatably couples the motor pedestal 30*b* to the first support portion 82, and the lean motor 25*a* as a drive device.

(3) A variety of other configurations may be employed as the configuration of vehicle, instead of the configurations described above. For example, in the embodiment of FIG. 18(A), the suspensions 70Lx, 70Rx may be substituted with the spacers 40L, 40R of FIG. 18(C). In this case, the center longitudinal member 21 is connected via the first support portion 82 and the spacers 40L, 40R indirectly to the vehicle body 90, and is an example of the second member of the lean mechanism. Alternatively, the first support portion 82 may be omitted, and the bearing 39 may couple the suspensions 70Lx, 70Rx to the upper lateral link member 31U. In this case, the suspensions 70Lx, 70Rx are connected directly to the vehicle body 90, and is an example of the second member of the lean mechanism. Alternatively, in the embodiment of FIG. 18(B), the motor pedestal 30a may be omitted, and the bearing 38a may couple the first support portion 82 to the motors 51L, 51R. In this case, the motors 51L, 51R are connected directly to the wheels 12L, 12R, and is an example of the first member of the lean mechanism. Alternatively, in the embodiment of FIG. 18(C), the first support portion 82 may be omitted, and the bearing 38b may couple the spacers 40L, 40R to the motor pedestal 30b. In this case, the spacers 40L, 40R are connected directly to the vehicle body 90, and is an example of the second member of the lean mechanism.

(4) A variety of methods may be employed in order to adjust the natural frequency of the vehicle body 90. In order to increase the natural frequency, it is possible to employ any one or more of the following methods A1-A7, for example.

A1: Increase the spring constant of suspension (e.g. suspensions 70L, 70R, 70Lx, 70Rx of FIG. 5(A), FIG. 18(A), suspensions 70bL, 70bR, 70bLx, 70bRx of FIG. 17(B), FIG. 18(C))

A2: Harden the pair of wheels 12L, 12R (e.g. Increase their air pressure)

A3: Increase the distance between the pair of wheels 12L, 12R

A4: Increase the stiffness of the vehicle body 90

A5: Decrease the mass of the vehicle body 90

A6: Increase the P gain Kp used to control the lean motor 25

A7: Increase the damping force of the shock absorber of the suspension (e.g. shock absorbers 72L, 72R of FIG. 18(A), shock absorbers 72bL, 72bR of FIG. 18(C))

In order to decrease the natural frequency, it is possible to employ inverse procedures of the above methods (e.g. Decrease the spring constant of the suspension).

As in the embodiments of FIG. 13, FIG. 14, the vehicle may include a changing unit which changes the natural frequency of the vehicle body 90 according to the vehicle velocity V (e.g. the P gain control unit 315). The changing unit may change the natural frequency according to any one or more of the above methods A1-A7. It should be noted that the correspondence between the natural frequency and the vehicle velocity V may be any of a variety of other correspondences instead of the correspondence shown in FIG. 15(C). For example, the natural frequency may change in a stepwise manner according to a change in vehicle velocity V. In general, it is possible to employ a variety of correspondences such that a lower vehicle velocity V results in a smaller natural frequency as compared to a higher vehicle velocity V.

In addition, the changing unit for changing the natural frequency may be implemented by an electric circuit including a computer, as the P gain control unit 315 of FIG. 13. Instead, the changing unit may be implemented by an electric circuit including no computer. In this manner, the changing unit may include an electric circuit which controls the natural frequency.

(5) In order to suppress an increase in oscillation of the vehicle body 90 in its width direction, it is preferable that the delay phase difference described above with regard to FIG. 9, FIG. 10 is smaller. A variety of methods may be employed in order to reduce the delay phase difference. It is possible to employ any one or more of the following methods B1-B5, for example.

B1: Increase an inertia moment of the front wheel 12F which rotates about the rotational axis Ax2 (FIG. 8)

B2: Decrease an inertia moment of a member (e.g. front fork 17) which turns about the turning axis Ax1 of the steering device 41 along with the front wheel 12F B3: Decrease a resistance (e.g. friction, damping force of a steering damper) to turning about the turning axis Ax1 of the steering device 41

B4: Increase the trail Lt (FIG. 1)

B5: Decrease an inertia moment (sometimes referred to as yaw moment) relating to a turn of the vehicle 10

(6) In the above embodiments, the state of the front wheel 12F which is a wheel turnable to right and to left (sometimes referred to as turn wheel) is switched according to the vehicle velocity V between the first state in which the wheel angle AF is allowed to change following a lean of the vehicle body 90 (FIG. 12: S120, S140) and the second state in which the wheel angle AF changes according to an input into the operation input unit (e.g. steering wheel 41a) (FIG. 12: S160, S180). The vehicle control unit 100 and the steering motor control unit 103 which control the operation mode of the steering device 41, and the steering device 41 as a whole are an example of turn wheel support unit (sometimes referred to as turn wheel support unit 180 (FIG. 1, FIG. 11) which supports the turn wheel, and can switch the state of the turn wheel between the first and second states. A variety of other configurations may be employed as a configuration of the turn wheel support unit. For example, the steering motor 65 may be omitted, and the steering wheel 41a and the front fork 17 may be connected via a clutch instead. When the clutch is disengaged, the state of the front wheel 12F is the first state. When the clutch is engaged, the state of the front wheel 12F is the second state. In this case, the steering device, which includes the clutch, and a switching unit, which switches the state of the clutch according to the vehicle velocity V, as a whole are an example of the turn wheel support unit. The switching unit for the clutch may be configured as an electric circuit, for example. In any event, an electric circuit including no computer may change the state of the drive wheel according to the vehicle velocity V.

In this manner, the turn wheel support unit may include a support unit control unit which controls the operating state of the turn wheel support unit. For example, the vehicle control unit 100 and the steering motor control unit 103 as a whole are an example of the support unit control unit (sometimes referred to as support unit control unit 170).

It should be noted that the switching of the state of the turn wheel may be omitted, and the turn wheel support unit may be configured to support the drive wheel only in the first state. For example, the steering motor 65 may be omitted, and the front fork 17 and the steering wheel 41a may be connected via an elastic body (e.g. torsion bar spring, coil spring, rubber) instead. In this case, the wheel angle AF of the front wheel 12F is changed by changing the steering wheel angle of the steering wheel 41a. The user can adjust the wheel angle AF to his/her desired angle by handling the steering wheel 41a. In addition, if the steering wheel angle is maintained at a constant value, the direction of the front wheel 12F (wheel angle AF) can be changed through a deformation of the elastic body. Therefore, the wheel angle AF can change following a lean of the vehicle body 90. In this manner, a configuration may be employed that includes the elastic body connecting the operation input unit (e.g. steering wheel 41a) and the turn wheel (e.g. front wheel 12F). It should be noted that when the switching of the state of the turn wheel is omitted, the turn wheel support unit does not include the control unit for switching the state of the turn wheel, but may be configured with a steering device supporting the turn wheel (e.g. steering device including an elastic body).

In general, the turn wheel support unit may be a device which supports the turn wheel while the wheel angle of the turn wheel changes following a lean of the vehicle body. The turn wheel support unit may be also a device which allows the wheel angle of the turn wheel to change following a lean of the vehicle body when the vehicle velocity V is within a particular range, and changes the wheel angle according to an input into the operation input unit when the vehicle velocity V is out of the particular range. For example, the turn wheel support unit may be a device which supports the turn wheel in an operation mode corresponding to the vehicle velocity V from among a plurality of operation modes. Where the plurality of operation modes include an operation mode for allowing the wheel angle of the turn wheel to change following a lean of the vehicle body, and an operation mode for changing the wheel angle according to an input into the operation input unit.

In addition, the turn wheel support unit may include a supporting member which rotatably supports one or more turn wheels, and a turning device which connects the vehicle body and the supporting member, and which supports the supporting member turnably to right and left relative to a direction of forward movement of the vehicle. If such a turn wheel support unit is employed, the supporting member also leans along with the vehicle body when the vehicle body leans. Therefore, the wheel angle can change following a lean of the vehicle body. The front fork 17 of FIG. 1, FIG. 16 is an example supporting member which rotatably supports the front wheel 12F. The steering motors 65, 65x are an example of the turning device which supports the front fork 17 turnably to right and left. FIG. 16 shows a more specific embodiment of the steering motor 65x. The steering motors 65x includes a rotor 66, a stator 67, and a bearing 68. One of the rotor 66 and stator 67 (in this embodiment, the rotor 66) is attached to the front fork 17. The other of the rotor 66 and stator 67 (in this embodiment, the stator 67) is attached to the main body 20 (in this example, the front portion 20a). The bearing 68 couples the main body 20 (in this example, the front portion 20a) and the front fork 17. In addition, the bearing 68 supports the front fork 17 turnably to right and left relative to the front direction DF. The configuration of the steering motor 65 of FIG. 1 may be the same as that of the steering motor 65x of FIG. 16.

The drive device such as the steering motors 65, 65x (specifically, drive device for controlling the wheel angle AF) may be omitted from the turning device. In this case, turning device may include a bearing such as the bearing 68 (FIG. 16). The bearing connects the vehicle body (e.g. main body 20) and the supporting member (e.g. front fork 17), and supports the supporting member turnably to right and left relative to the front direction DF of the vehicle. In this manner, the bearing rotatably connects the supporting member to the vehicle body. It should be noted that the bearing may be a ball bearing, or may be a sliding bearing instead. In any event, the turning device may be connected directly to the vehicle body, or may be connected indirectly to the vehicle body via another member. Alternatively, the supporting member which rotatably supports the turn wheel may be a differently configured member (e.g. cantilevered member) instead of the front fork 17. Alternatively, the vehicle may include a plurality of supporting members if the vehicle includes a plurality of turn wheels. Each of the plurality of supporting members may rotatably support one or more of the turn wheels. Each supporting member may be provided with one turning device.

In addition, the vehicle 10d of FIG. 16 includes the connecting unit 500. The turn wheel support unit 180d of the vehicle 10d includes the connecting unit 500 in addition to the elements of the turn wheel support unit 180 of FIG. 1. However, the connecting unit 500 may be omitted.

(7) As the configuration of the output limiting unit which lowers the outputs of the drive devices when the vehicle velocity V exceeds the upper limit velocity Vth, a variety of other configurations may be employed instead of the configuration using the vehicle control unit 100 (FIG. 11) and the drive device control unit 101. For example, a switch may be employed that cuts power supply to the motors 51L, 51R in response to a signal from the vehicle velocity sensor 122 without using any computer. It should be noted that the output limiting unit may be omitted.

(8) As the method of controlling the vehicle, a variety of other methods may be employed instead of the method described above with regard to FIG. 12, FIG. 14. For example, the first velocity V1 (FIG. 10) may be equal to zero. In this case, the first frequency FQ1 mapped to the first velocity V1 may be non-identifiable. The natural frequency of the vehicle body 90 is preferably larger than the second frequency FQ2 mapped to the second velocity V2. The steering device 41, 41x operates in the first mode (FIG. 12: S120, S140) when the vehicle velocity V does not exceed the second velocity V2 while the steering device 41, 41x operates in the second mode (FIG. 12: S160, S180) when the vehicle velocity V exceeds the second velocity V2.

In any event, the second velocity V2 may be equal to the maximum velocity of the vehicle 10, 10a-10g, or may be lower than the maximum velocity. Where the upper limit velocity Vth (FIG. 12: S102) for lowering the output of the drive device may be employed as the maximum velocity of the vehicle 10, 10a-10g. Instead, the highest vehicle velocity V when the output of the drive device is at its maximum (e.g. the highest vehicle velocity V during running on a horizontal ground GL) may be employed as the maximum velocity. In general, the highest velocity when the vehicle 10, 10a-10g moves forward on a horizontal ground GL may be employed as the maximum velocity.

It should be noted that if the second velocity V2 is equal to or larger than the maximum velocity, the vehicle velocity V does not exceed the second velocity V2. Therefore, the steering device 41, 41x operates in the first mode (FIG. 12: S120, S140) when the vehicle velocity V is equal to or larger than the first velocity V1 while the steering device 41, 41x operates in the second mode (FIG. 12: S160, S180) when the vehicle velocity V is smaller than the first velocity V1. Where the first velocity V1 may be equal to zero. In this case, the steering devices 41, 41x may operate in the first mode independently of the vehicle velocity V. Accordingly, the second mode may be omitted. For example, S120, S140, S160, S180 of FIG. 12 may be omitted. Thus, the above-mentioned turn wheel support unit may be employed that is configured to support the drive wheel only in the first state, and the steering motor control unit 103 (FIG. 11) and the steering motor 65 may be omitted.

(9) As the configuration of the connecting unit which is connected to the operation input unit and to the supporting member, a variety of other configurations may be employed instead of that of the connecting unit 500 of FIG. 16. The configuration of the connecting unit may be any of a variety of configurations in which it is connected mechanically to the operation input unit and to the supporting member, transmits a torque from the operation input unit to the supporting member in response to a mechanical motion of the operation input unit due to handling of the operation input unit, and allows a direction (e.g. wheel angle) of each of one or more turn wheels to change following a change in lean of the vehicle body independently of an input into the operation input unit.

(10) As the configuration of vehicle, a variety of other configurations may be employed instead of the above-described configurations. For example, the trail Lt (FIG. 1) may be equal to zero, or may be smaller than zero. In this case again, as described above with regard to FIG. 8, with the angular momentum of the rotating front wheel 12F, the direction of the front wheel 12F (i.e. wheel angle AF) can change following a lean of the vehicle body 90. The computer such as the controller 110, 110c (FIG. 11, FIG. 13) may be omitted. For example, an electric circuit including no computer may control the motors 51R, 51L, 25, 25a, 65 in response to signals from the sensors 122, 123, 124, 125, 145, 146, and the switch 47. Alternatively, a machine which operates using a drive force of hydraulic pressure or motor may control the motors 51R, 51L, 25, 25a, 65 instead of the electric circuit. In addition, a variety of configurations may be employed as the total number and arrangement of the plurality of wheels. For example, there may be two front wheels in total and one rear wheel in total. Alternatively, there may be two front wheels in total and two rear wheels in total. Furthermore, a pair of wheels spaced apart from each other in the width direction may be turn wheels. The rear wheels may be turn wheels. The drive wheel may be the front wheel. In any event, the vehicle preferably includes three or more wheels, including a pair of wheels spaced apart from each other in the width direction of the vehicle and a turn wheel(s) constituted by the pair of wheels or another wheel(s). In addition, the three or more wheels of the vehicle preferably include a front wheel(s) and a rear wheel(s) disposed in the back direction DB side of the front wheel. This configuration enables the vehicle to self-stand when it is stopped. The drive device for driving the drive wheel may be any device which rotates the wheel (e.g. internal combustion engine) instead of the electric motor. Alternatively, the drive device may be omitted. That is, the vehicle may be a human-powered vehicle. In this case, the lean mechanism may be a human-powered lean mechanism which operates in response to handling of the operation input unit. In addition, the maximum riding capacity of the vehicle may be two or more persons instead of one person.

(11) In each embodiment described above, some of the components which are achieved by hardware may be substituted with software while some or all of the components which are achieved by software may be substituted with hardware. For example, the function of the vehicle control unit 100 in FIG. 11 may be achieved by a dedicated hardware circuitry.

In addition, if some or all of the functions of the present invention are achieved by a computer program, the program can be provided in the form of a computer-readable storage medium (e.g. non-transitory storage medium) having the program stored therein. The program can be used while being stored in a storage medium (computer-readable storage medium) which is the same as or different from the provided storage medium. The "computer-readable storage medium" is not limited to a portable storage medium such as memory card or CD-ROM, but may also include an internal storage within the computer such as various types of ROM, and an external storage connected to the computer such as hard disk drive.

The present invention has been described above with reference to the embodiments and the modifications although the above-described embodiments are intended to facilitate the understanding of the invention, but not to limit the invention. The present invention may be modified or improved without departing from the spirit and scope of the claims, and includes its equivalents.

INDUSTRIAL APPLICABILITY

The present invention can be preferably used for a vehicle.

DESCRIPTION OF THE REFERENCES 10, 10a-10g vehicle
11 seat
12F front wheel
12L left rear wheel (drive wheel)
12R right rear wheel (drive wheel)
12Fc gravity center
12La wheel
12Lb tire
12Ra wheel
12Rb tire
17 front fork
20 main body
20a front portion
20b bottom portion
20c rear portion
20d support portion
25 lean motor
25a lean motor
30 link mechanism
30a, 30b motor pedestal
31U upper lateral link member
31D lower lateral link member
33L left longitudinal link member
21 center longitudinal link member
33R right longitudinal link member
40L spacer
41 steering device
41a steering wheel
41ax supporting rod
45 accelerator pedal
46 brake pedal
47 shift switch
51L left electric motor
51R right electric motor
65, 65x steering motor
66 rotor
67 stator
68 bearing
70, 70x suspension system
70L, 70Lx left suspension
70R, 70Rx right suspension
70La central axis
70bL, 70bR, 70bLx, 70bRx suspension
71L, 71R coil spring
72L, 72R shock absorber
71L, 71R, 71bL, 71bR coil spring
72L, 72R, 72bL, 72bR shock absorber
73bL, 73bR arm
75 connector
80 rear wheel support
82 first support portion
83 second support portion
90 vehicle body
90c gravity center
100 vehicle control unit
101 drive device control unit 102 lean motor control unit
103 steering motor control unit
110 controller
200, 200x, 200a, 200fx, 200gx lean mechanism
300x, 300gx roll device
310 first summing point
315 P gain control unit
320 P control unit
330 I control unit
340 D control unit
350 second summing point
360 electric power control unit
120 battery
122 vehicle velocity sensor
123 steering wheel angle sensor
124 wheel angle sensor
125 lean angle sensor
145 accelerator pedal sensor
146 brake pedal sensor
147 shift switch
500 connecting unit
T lean angle
V velocity
R turning radius
m mass
P1 contact point
P2 intersection point
DF front direction
DB back direction
DL left direction
DR right direction
DU upward direction
DD downward direction
AF wheel angle
GL ground
Cb rear center
Cf front center
Lh wheelbase
Tr roll angle
Cr turning center
Lt trail (distance)
DBU vehicle body upward direction
DVU vehicle upward direction
AxL lean axis
AxR roll axis

The invention claimed is:

1. A vehicle comprising:
three or more wheels including a pair of wheels spaced apart from each other in a width direction of the vehicle and one or more turn wheels constituted by another wheel or the pair of wheels, the one or more turn wheels being turnable to right and left relative to a direction of forward movement of the vehicle;
a vehicle body coupled to the three or more wheels and rollable in the width direction;
an operation input unit to be operated to input a turning direction; and
a lean mechanism configured to lean the vehicle body in the width direction,
wherein the vehicle is configured to travel, when a vehicle velocity is within a velocity range from not less than a first velocity of at least zero to not more than a second velocity larger than the first velocity, in a mode in which the vehicle body is leaned by the lean mechanism according to an input into the operation input unit, and a wheel angle changes following a lean of the vehicle body, the wheel angle is an angle of traveling direction of the one or more turn wheels with reference to the direction of forward movement of the vehicle, and
when the vehicle velocity is within the velocity range, a natural frequency of a roll oscillation of the vehicle body is either within a range of smaller than a reference frequency or within a range of larger than the reference frequency, the reference frequency being a frequency at which oscillation of the wheel angle of the one or more turn wheels has phase delay of 90 degrees relative to the roll oscillation of the vehicle body in the width direction.

2. The vehicle of claim 1,
wherein when the reference frequency at the first velocity is specified as a first reference frequency, and the reference frequency at the second velocity is specified as a second reference frequency,
the natural frequency of the roll oscillation of the vehicle body is either within a range of smaller than the first reference frequency or within a range of larger than the second reference frequency.

3. The vehicle of claim 2, comprising:
a turn wheel support unit supporting the one or more turn wheels,
wherein the first velocity is larger than zero,
the natural frequency of the vehicle body is smaller than the first reference frequency, and
the turn wheel support unit
allows a wheel angle of the one or more turn wheels to change following a lean of the vehicle body when the vehicle velocity is within the velocity range, and
changes the wheel angle according to an input into the operation input unit when the vehicle velocity is smaller than the first velocity.

4. The vehicle of claim 2,
wherein the natural frequency of the vehicle body is larger than the second reference frequency, and
the second velocity is a maximum velocity of the vehicle.

5. The vehicle of claim 4, comprising:
a drive device configured to drive at least one of the three or more wheels; and
an output limiting unit configured to lower output of the drive device when the vehicle velocity exceeds a predetermined upper limit,
wherein the maximum velocity is the upper limit of the vehicle velocity.

6. The vehicle of claim 2, comprising:
a turn wheel support unit supporting the one or more turn wheels,
wherein the natural frequency of the vehicle body is larger than the second reference frequency, and
the turn wheel support unit
allows a wheel angle of the one or more turn wheels to change following a lean of the vehicle body when the vehicle velocity is within the velocity range, and
changes the wheel angle according to an input into the operation input unit when the vehicle velocity exceeds the second velocity.

7. The vehicle of claim 1, comprising:
changing unit configured to change the natural frequency of the roll oscillation of the vehicle body,
wherein the changing unit changes the natural frequency according to the vehicle velocity.

8. The vehicle of claim 7,
wherein when the vehicle velocity is lower, the changing unit makes the natural frequency smaller than when the vehicle velocity is higher.

9. The vehicle of claim 1, comprising:
a supporting member rotatably supporting the one or more turn wheels,
a turning device connecting the vehicle body and the supporting member, and supporting the supporting member turnably to right and left relative to the direction of forward movement of the vehicle, and
a connecting unit connected to the operation input unit and to the supporting member, the connecting unit allowing the wheel angle of the one or more turn wheels to change following a change in lean of the vehicle body independently of an input into the operation input unit.

* * * * *